United States Patent

Hirano et al.

[11] Patent Number: 6,144,412
[45] Date of Patent: Nov. 7, 2000

[54] METHOD AND CIRCUIT FOR SIGNAL PROCESSING OF FORMAT CONVERSION OF PICTURE SIGNAL

[75] Inventors: Yasuhiro Hirano, Hachioji; Kazuo Ishikura, Kunitachi; Masato Sugiyama; Mitsuo Nakajima, both of Yokohama; Shoji Kimura, Kawasaki; Toshiyuki Kurita, Yokohama; Tsuguo Itagaki, Yokohama; Haruki Takata, Yokohama, all of Japan

[73] Assignee: Hitachi, Ltd., Tokyo, Japan

[21] Appl. No.: 08/950,666

[22] Filed: Oct. 15, 1997

[30] Foreign Application Priority Data

Oct. 15, 1996 [JP] Japan .................................. 8-272543

[51] Int. Cl.⁷ ...................................................... H04N 7/01
[52] U.S. Cl. .......................... 348/441; 348/445; 348/448; 348/452; 348/556
[58] Field of Search .................................. 348/441, 448, 348/449, 451, 452, 458, 459, 443, 554, 555, 556, 558, 581; H04N 7/01, 11/20

[56] References Cited

U.S. PATENT DOCUMENTS 5,227,882 7/1993 Kato ........................................ 348/441
5,485,216 1/1996 Lee .......................................... 348/443
5,497,199 3/1996 Asada et al. .

FOREIGN PATENT DOCUMENTS 0639029 2/1995 European Pat. Off. .
86/03921 7/1986 WIPO .

*Primary Examiner*—Michael H. Lee
*Attorney, Agent, or Firm*—Antonelli, Terry, Stout & Kraus, LLP

[57] ABSTRACT

In order to carry out format conversion or scaling processing of picture signal by a memory having a small capacity, picture signals of interlace scanning are converted into picture signals of progressive scanning by interpolation by using an IP convertor 1 and a multiple scan convertor 3, a scaling processing of expansion and compression in the horizontal direction is firstly performed by using a horizontal scaling unit 5, processing of expansion, compression, frame rate conversion, synchronization and the like are secondly performed by using a vertical scaling unit 6 and commonly using memories used in scaling processing in the vertical direction and finally, color space conversion or inverse gamma processing is performed by using a picture quality improving unit 8 thereby converting the picture signals into picture signals S6 having a predetermined format.

35 Claims, 28 Drawing Sheets

[LINE MEMORY OPERATION]

fH : 1H LINE PERIOD OF INTERLACE SCANNING
1/2fH : 1H LINE PERIOD OF PROGRESSIVE SCANNING

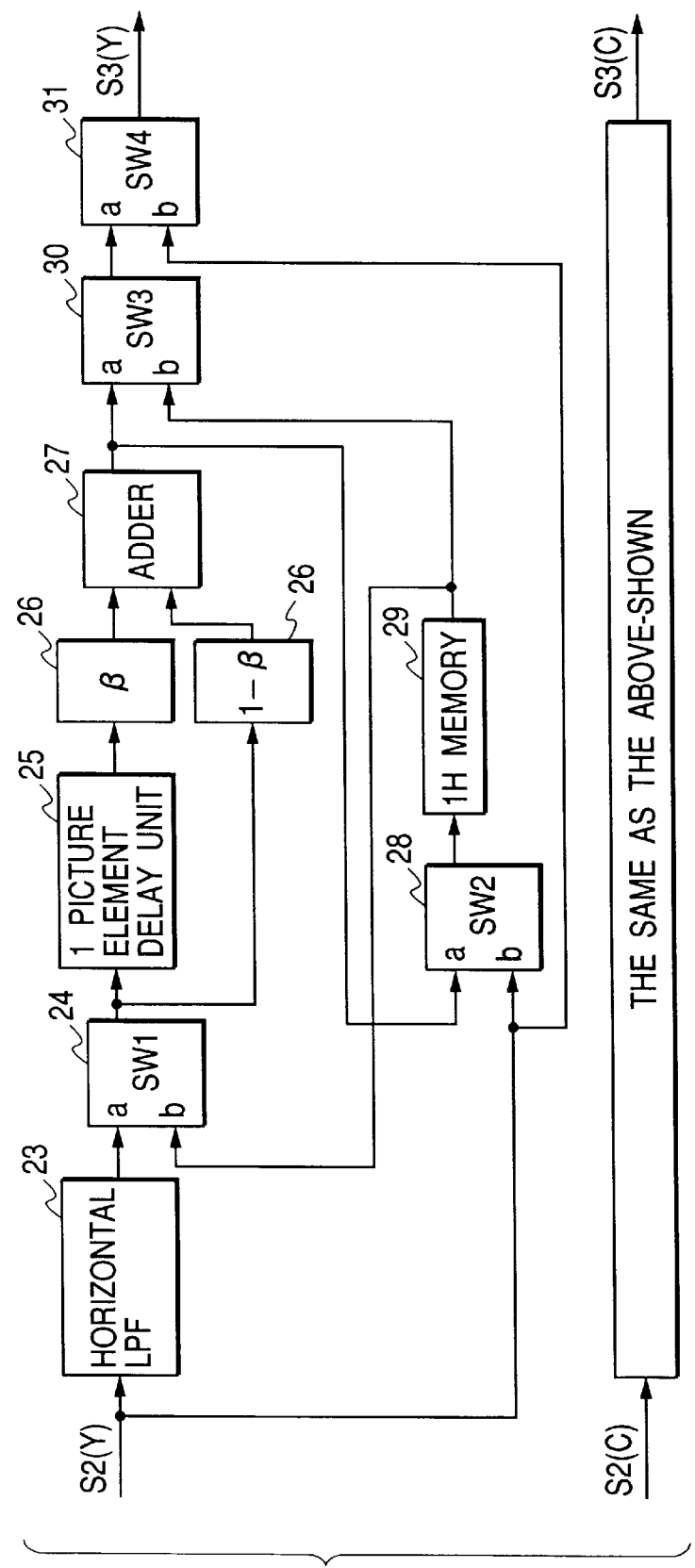

FIG. 4B

[SWITCH CONTROL]

| SIGNAL PROCESSING | SW1 | SW2 | SW3 | SW4 |
|---|---|---|---|---|
| HORIZONTAL COMPRESSION | a | a | b | a |
| HORIZONTAL EXPANSION | b | b | a | a |
| THROUGH | – | – | – | b |

FIG. 5B

[SWITCH CONTROL]

| SIGNAL PROCESSING | SW1 | SW2 | SW3 | SW4 |
|---|---|---|---|---|
| VERTICAL COMPRESSION | a | a | b | a |
| VERTICAL EXPANSION | b | b | a | a |
| PAL 100Hz | – | b | b | a |
| NTSC-PAL 100Hz | b | b | c | a |
| PAL-NTSC CONVERSION | a | a | b | a |
| THROUGH | – | – | – | b |

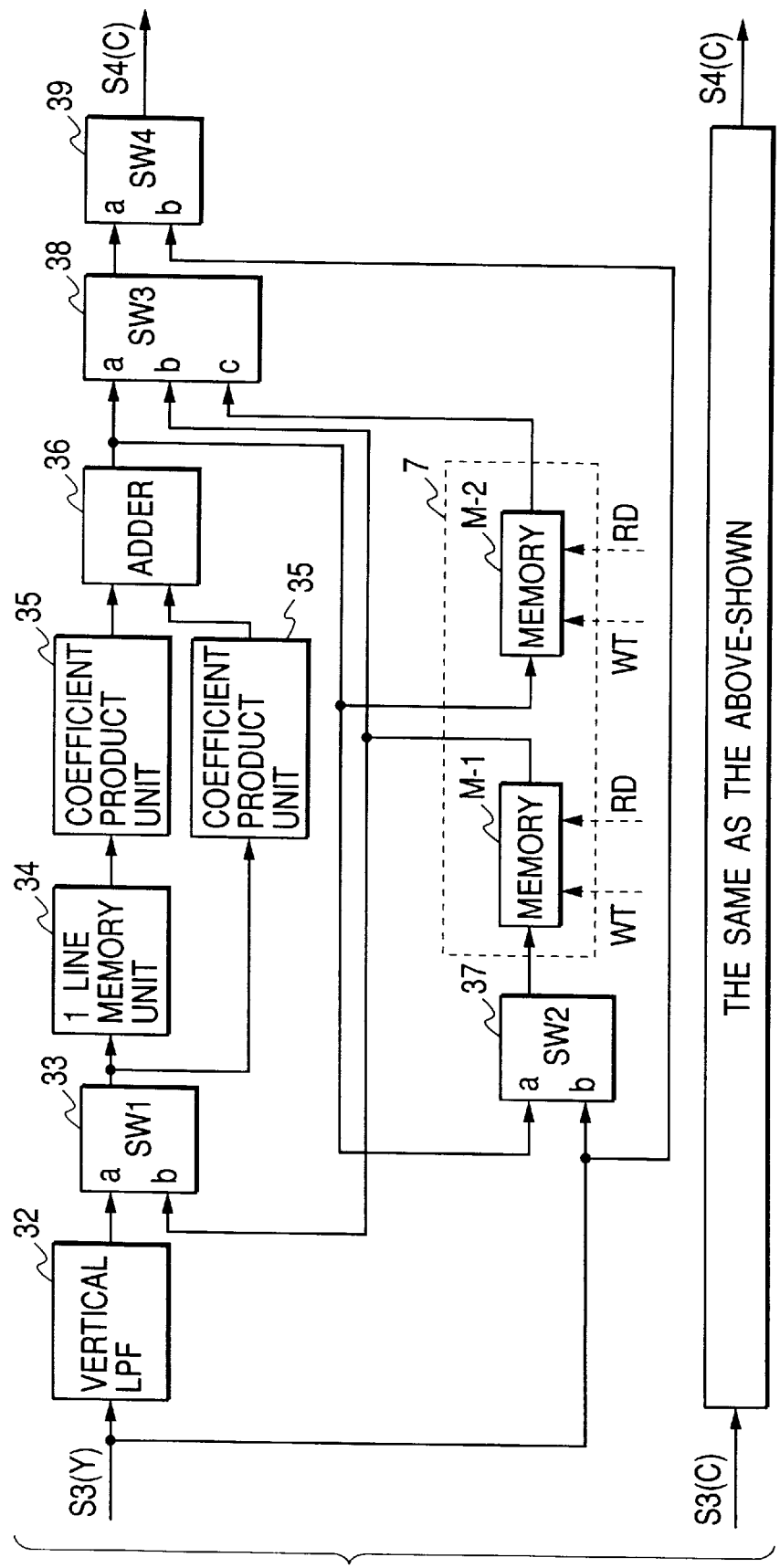

[NTSC-PAL 100Hz]

[PAL-NTSC CONVERSION]

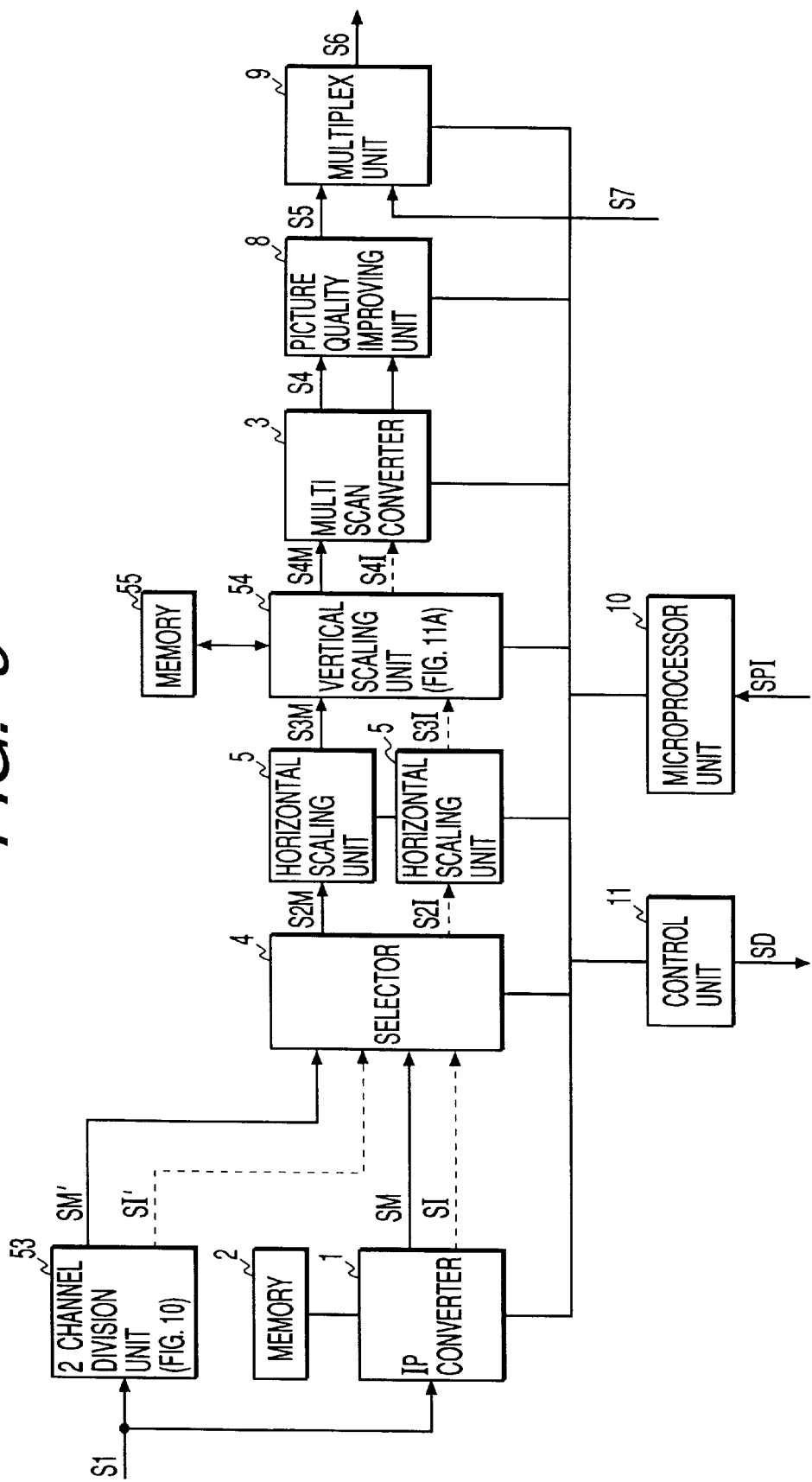

[SWITCH CONTROL]

| SIGNAL PROCESSING | SW1 | SW2 | SW3 | SW4 |
|---|---|---|---|---|
| VERTICAL COMPRESSION | a | a | b | a |
| VERTICAL EXPANSION | b | b | a | a |
| PAL 100Hz | — | b | b | a |
| NTSC-PAL 100Hz | b | b | c | a |
| PAL-NTSC CONVERSION | a | a | b | a |
| THROUGH | — | — | — | b |

[VERTICAL COMPRESSION]

[VERTICAL EXPANSION]

[PAL 100Hz]

[NTSC-PAL 100Hz]

[PAL-NTSC CONVERSION]

FIG. 15A
[SIGNAL PROCESSING FOR DOUBLE WINDOWS]
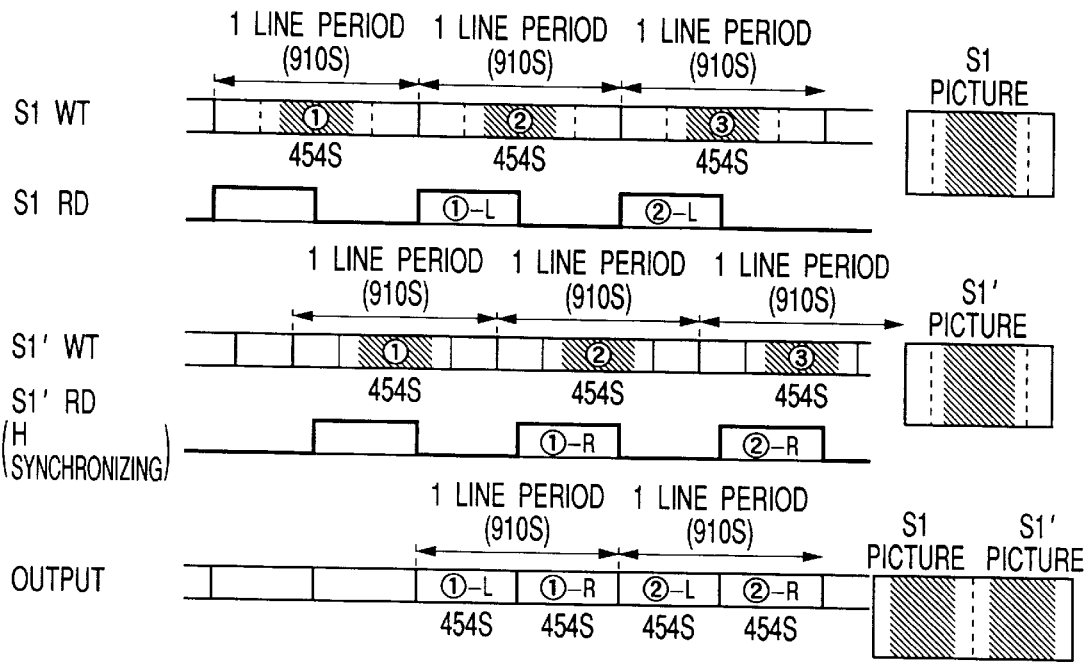
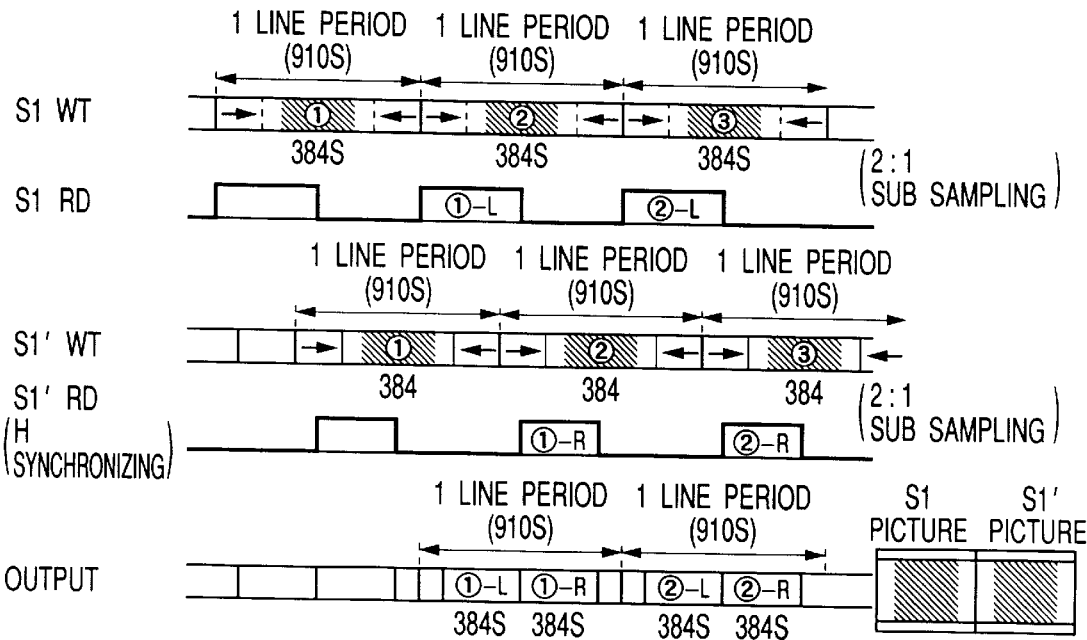

FIG. 15B
[SIGNAL PROCESSING FOR PIP WINDOWS]

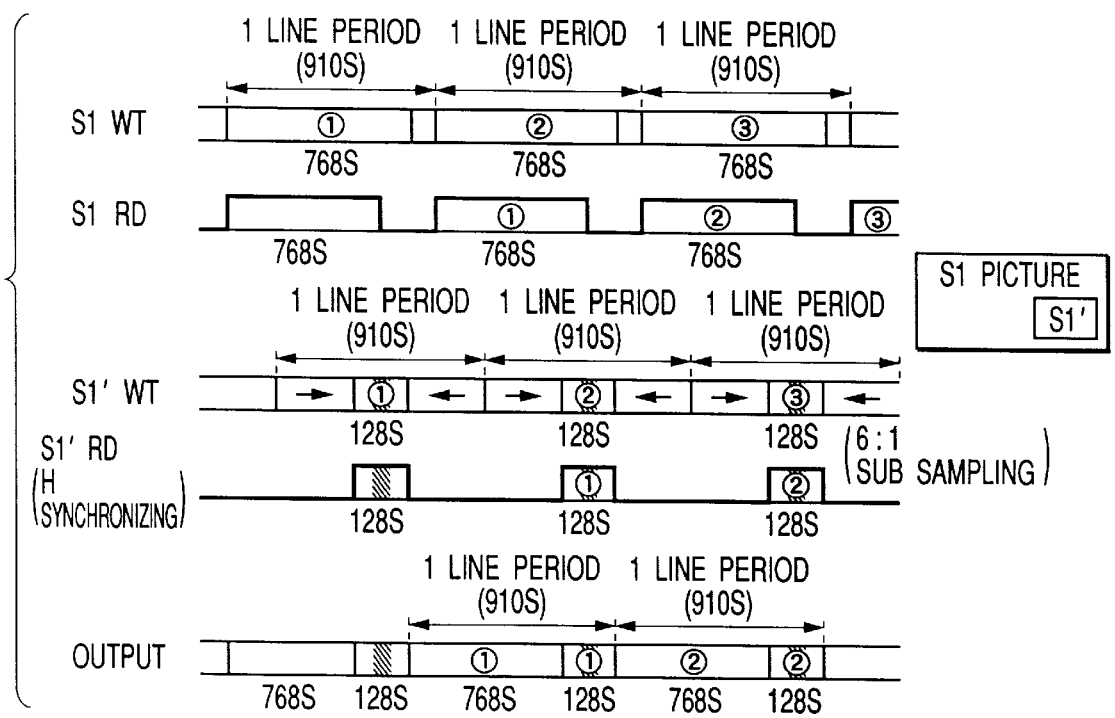

FIG. 16A
[SIGNAL PROCESSING]

| DOUBLE WINDOWS MODE | HORIZONTAL SCALING | VERTICAL SCALING |
|---|---|---|
| CUT MODE | 4-3 COMPRESSION CONVERSION | VERTICAL SYNCHRONIZING |
| FULL MODE | THROUGH | 3-2 COMPRESSION CONVERSION VERTICAL SYNCHRONIZING |

| PIP WINDOWS MODE | HORIZONTAL SCALING | VERTICAL SCALING |
|---|---|---|
| MAIN PICTURE (S1) | 4-3 COMPRESSION CONVERSION | THROUGH |
| SUB PICTURE (S1') | 1-2 EXPANSION CONVERSION | 9-4 COMPRESSION CONVERSION VERTICAL SYNCHRONIZING |

[VERTICAL SYNCHRONIZING]

[MEMORY OPERATION IN VERTICAL SYNCHRONIZING PROCESSING]

[SMOOTH WIDE]

[SQUEEZE (FULL MODE)]

[HORIZONTAL AND VERTICAL FLEXIBLE COMPRESSION]

[HORIZONTAL AND VERTICAL FLEXIBLE EXPANSION]

FIG. 20A

[4-3 CONVERSION]

$$\begin{vmatrix} Y1 \\ Y2 \\ Y3 \end{vmatrix} = \begin{vmatrix} 1 & 0 & 0 & 0 \\ 0 & 2/3 & 1/3 & 0 \\ 0 & 0 & 1/3 & 2/3 \end{vmatrix} \begin{vmatrix} X1 \\ X2 \\ X3 \\ X4 \end{vmatrix}$$

FIG. 20B

[3-4 CONVERSION]

$$\begin{vmatrix} Y1 \\ Y2 \\ Y3 \\ Y4 \end{vmatrix} = \begin{vmatrix} 1 & 0 & 0 & 0 \\ 1/4 & 3/4 & 0 & 0 \\ 0 & 2/4 & 2/4 & 0 \\ 0 & 0 & 3/4 & 1/4 \end{vmatrix} \begin{vmatrix} X1 \\ X2 \\ X3 \\ X4 \end{vmatrix}$$

X4 IS THE SAME AS NEXT X1

FIG. 20C

[6-5 CONVERSION]

$$\begin{vmatrix} Y1 \\ Y2 \\ Y3 \\ Y4 \\ Y5 \end{vmatrix} = \begin{vmatrix} 1 & 0 & 0 & 0 & 0 & 0 \\ 0 & 4/5 & 1/5 & 0 & 0 & 0 \\ 0 & 0 & 3/5 & 2/5 & 0 & 0 \\ 0 & 0 & 0 & 2/5 & 3/5 & 0 \\ 0 & 0 & 0 & 0 & 1/5 & 4/5 \end{vmatrix} \begin{vmatrix} X1 \\ X2 \\ X3 \\ X4 \\ X5 \\ X6 \end{vmatrix}$$

FIG. 20D

[5-6 CONVERSION]

$$\begin{vmatrix} Y1 \\ Y2 \\ Y3 \\ Y4 \\ Y5 \\ Y6 \end{vmatrix} = \begin{vmatrix} 1 & 0 & 0 & 0 & 0 & 0 \\ 1/6 & 5/6 & 0 & 0 & 0 & 0 \\ 0 & 2/6 & 4/6 & 0 & 0 & 0 \\ 0 & 0 & 3/6 & 3/6 & 0 & 0 \\ 0 & 0 & 0 & 4/6 & 2/6 & 0 \\ 0 & 0 & 0 & 0 & 5/6 & 1/6 \end{vmatrix} \begin{vmatrix} X1 \\ X2 \\ X3 \\ X4 \\ X5 \\ X6 \end{vmatrix}$$

X6 IS THE SAME AS NEXT X1

FIG. 21

| INPUT SIGNAL | | IP CONVERSION | HORIZONTAL SCALING | VERTICAL SCALING | REMARKS |
|---|---|---|---|---|---|
| 525/60/2:1 SYSTEM (NTSC) | | ◯ | 4-3 CONVERSION | THROUGH | NORMAL MODE |
| | | ◯ | 4-3 CONVERSION * | THROUGH | ZOOM WIDE MODE |
| | | ◯ | THROUGH | 3-4 CONVERSION | CINEMA MODE |
| | | ◯ | 1-N CONVERSION | 1-N CONVERSION | N TIMES ZOOM MODE |
| | | ◯ | N-1 CONVERSION | N-1 CONVERSION | 1/N COMPRESSION |
| 525/60/1:1 SYSTEM (EDTV) | | THROUGH | THROUGH | THROUGH | |
| | | THROUGH | 1-N CONVERSION | 1-N CONVERSION | N TIMES ZOOM MODE |
| | | THROUGH | N-1 CONVERSION | N-1 CONVERSION | 1/N COMPRESSION |
| 1125/60/2:1 SYSTEM (HDTV) | | THROUGH | SUB-SAMPLING ↓ | 17-16 CONVERSION | |
| | | THROUGH | 1-N CONVERSION | 1-N CONVERSION | N TIMES ZOOM MODE |
| | | THROUGH | N-1 CONVERSION | N-1 CONVERSION | 1/N COMPRESSION |
| 625/50/2:1 SYSTEM (PAL) | | ◯ | 4-3 CONVERSION | 6-5 CONVERSION ** | NORMAL MODE |
| | | ◯ | 4-3 CONVERSION * | 6-5 CONVERSION ** | ZOOM WIDE MODE |
| | | ◯ | THROUGH | 9-10 CONVERSION ** | CINEMA MODE |
| | | ◯ | 1-N CONVERSION | 1-N CONVERSION ** | N TIMES ZOOM MODE |
| | | ◯ | N-1 CONVERSION | N-1 CONVERSION ** | 1/N COMPRESSION |
| PC | VGA SYSTEM (640×480) | THROUGH | 4-3 CONVERSION | THROUGH | NORMAL MODE |
| | | THROUGH | 1-N CONVERSION | 1-N CONVERSION | N TIMES ZOOM MODE |
| | | THROUGH | N-1 CONVERSION | N-1 CONVERSION | 1/N COMPRESSION |
| | SVGA SYSTEM (800×600) | THROUGH | 4-3 CONVERSION | 5-4 CONVERSION | NORMAL MODE |
| | | THROUGH | 1-N CONVERSION | 1-N CONVERSION | N TIMES ZOOM MODE |
| | | THROUGH | N-1 CONVERSION | N-1 CONVERSION | 1/N COMPRESSION |
| | XGA SYSTEM (1024×768) | THROUGH | 4-3 CONVERSION | 8-5 CONVERSION | NORMAL MODE |
| | | THROUGH | 1-N CONVERSION | 1-N CONVERSION | N TIMES ZOOM MODE |
| | | THROUGH | N-1 CONVERSION | N-1 CONVERSION | 1/N COMPRESSION |

\* 1-1 CONVERSION AT RIGHT & LEFT CORNER AREA
\*\* INCLUDING FRAME RATE CONVERSION PROCESSING

FIG. 22

| INPUT SIGNAL | | IP CONVERSION | HORIZONTAL SCALING | VERTICAL SCALING | REMARKS |
|---|---|---|---|---|---|
| 525/60/2:1 SYSTEM (NTSC) | | ○ | 4-3 CONVERSION | 5-6 CONVERSION ** | NORMAL MODE |
| | | ○ | 4-3 CONVERSION * | 5-6 CONVERSION ** | ZOOM WIDE MODE |
| | | ○ | THROUGH | 5-8 CONVERSION ** | CINEMA MODE |
| | | ○ | 1-N CONVERSION | 1-N CONVERSION ** | N TIMES ZOOM MODE |
| | | ○ | N-1 CONVERSION | N-1 CONVERSION ** | 1/N COMPRESSION |
| 525/60/1:1 SYSTEM (EDTV) | | THROUGH | THROUGH | 5-6 CONVERSION ** | |
| | | THROUGH | 1-N CONVERSION | 1-N CONVERSION ** | N TIMES ZOOM MODE |
| | | THROUGH | N-1 CONVERSION | N-1 CONVERSION ** | 1/N COMPRESSION |
| 1125/60/2:1 SYSTEM (HDTV) | | THROUGH | SUB-SAMPLING ↓ | 15-16 CONVERSION ** | |
| | | THROUGH | 1-N CONVERSION | 1-N CONVERSION ** | N TIMES ZOOM MODE |
| | | THROUGH | N-1 CONVERSION | N-1 CONVERSION ** | 1/N COMPRESSION |
| 625/50/2:1 SYSTEM (PAL) | | ○ | 4-3 CONVERSION | THROUTH # | NORMAL MODE |
| | | ○ | 4-3 CONVERSION * | THROUTH # | ZOOM WIDE MODE |
| | | ○ | THROUGH | 3-4 CONVERSION # | CINEMA MODE |
| | | ○ | 1-N CONVERSION | 1-N CONVERSION # | N TIMES ZOOM MODE |
| | | ○ | N-1 CONVERSION | N-1 CONVERSION # | 1/N COMPRESSION |
| PC | VGA SYSTEM (640×480) | THROUGH | 4-3 CONVERSION | 5-6 CONVERSION ** | NORMAL MODE |
| | | THROUGH | 1-N CONVERSION | 1-N CONVERSION ** | N TIMES ZOOM MODE |
| | | THROUGH | N-1 CONVERSION | N-1 CONVERSION ** | 1/N COMPRESSION |
| | SVGA SYSTEM (800×600) | THROUGH | 4-3 CONVERSION | THROUGH ** | NORMAL MODE |
| | | THROUGH | 1-N CONVERSION | 1-N CONVERSION ** | N TIMES ZOOM MODE |
| | | THROUGH | N-1 CONVERSION | N-1 CONVERSION ** | 1/N COMPRESSION |
| | XGA SYSTEM (1024×768) | THROUGH | 4-3 CONVERSION | 4-3 CONVERSION ** | NORMAL MODE |
| | | THROUGH | 1-N CONVERSION | 1-N CONVERSION ** | N TIMES ZOOM MODE |
| | | THROUGH | N-1 CONVERSION | N-1 CONVERSION ** | 1/N COMPRESSION |

\* 1-1 CONVERSION AT RIGHT & LEFT CORNER AREA
\*\* INCLUDING FRAME RATE CONVERSION & FIELD MULTIPLE SCAN PROCESSING
\# INCLUDING FIELD MULTIPLE SCAN PROCESSING

FIG. 23

| INPUT SIGNAL | | IP CONVERSION | HORIZONTAL SCALING | VERTICAL SCALING | REMARKS |
|---|---|---|---|---|---|
| 525/60/2:1 SYSTEM (NTSC) | | ○ | 4-3 CONVERSION | 16-17 CONVERSION # | NORMAL MODE |
| | | ○ | 4-3 CONVERSION * | 16-17 CONVERSION # | ZOOM WIDE MODE |
| | | ○ | THROUGH | 12-17 CONVERSION # | CINEMA MODE |
| | | ○ | 1-N CONVERSION | 1-N CONVERSION # | N TIMES ZOOM MODE |
| | | ○ | N-1 CONVERSION | N-1 CONVERSION # | 1/N COMPRESSION |
| 525/60/1:1 SYSTEM (EDTV) | | THROUGH | THROUGH | 16-17 CONVERSION # | |
| | | THROUGH | 1-N CONVERSION | 1-N CONVERSION # | N TIMES ZOOM MODE |
| | | THROUGH | N-1 CONVERSION | N-1 CONVERSION # | 1/N COMPRESSION |
| 1125/60/2:1 SYSTEM (HDTV) | | THROUGH | THROUGH | THROUGH | |
| | | THROUGH | 1-N CONVERSION | 1-N CONVERSION | N TIMES ZOOM MODE |
| | | THROUGH | N-1 CONVERSION | N-1 CONVERSION | 1/N COMPRESSION |
| 625/50/2:1 SYSTEM (PAL) | | ○ | 4-3 CONVERSION | 16-15 CONVERSION ## | NORMAL MODE |
| | | ○ | 4-3 CONVERSION * | 16-15 CONVERSION ## | ZOOM WIDE MODE |
| | | ○ | THROUGH | 4-5 CONVERSION ## | CINEMA MODE |
| | | ○ | 1-N CONVERSION | 1-N CONVERSION ## | N TIMES ZOOM MODE |
| | | ○ | N-1 CONVERSION | N-1 CONVERSION ## | 1/N COMPRESSION |
| PC | VGA SYSTEM (640×480) | THROUGH | 4-3 CONVERSION | 16-17 CONVERSION # | NORMAL MODE |
| | | THROUGH | 1-N CONVERSION | 1-N CONVERSION # | N TIMES ZOOM MODE |
| | | THROUGH | N-1 CONVERSION | N-1 CONVERSION # | 1/N COMPRESSION |
| | SVGA SYSTEM (800×600) | THROUGH | 4-3 CONVERSION | 20-17 CONVERSION # | NORMAL MODE |
| | | THROUGH | 1-N CONVERSION | 1-N CONVERSION # | N TIMES ZOOM MODE |
| | | THROUGH | N-1 CONVERSION | N-1 CONVERSION # | 1/N COMPRESSION |
| | XGA SYSTEM (1024×768) | THROUGH | 4-3 CONVERSION | 32-21 CONVERSION # | NORMAL MODE |
| | | THROUGH | 1-N CONVERSION | 1-N CONVERSION # | N TIMES ZOOM MODE |
| | | THROUGH | N-1 CONVERSION | N-1 CONVERSION # | 1/N COMPRESSION |

\* 1-1 CONVERSION AT RIGHT & LEFT CORNER AREA
\# INCLUDING INTERLACE CONVERSION PROCESSING
\#\# INCLUDING FRAME RATE CONVERSION & INTERLACE CONVERSION PROCESSING

METHOD AND CIRCUIT FOR SIGNAL PROCESSING OF FORMAT CONVERSION OF PICTURE SIGNAL

BACKGROUND OF THE INVENTION

The present invention relates to signal processing of format conversion of picture signal, particularly to a method and a circuit for signal processing of format conversion of picture signal preferable to converting a plurality of kinds of formats of picture signals into picture signals of predetermined display formats of picture output devices or conversion of flexible compression and flexible expansion of pictures in a horizontal and a vertical direction, or the like.

In recent years, with progress in multimedia, in respect of picture signals, kinds and modes of pictures to be handled increase rapidly and are advancing in a direction of diversification. Further, in respect of picture output devices for displaying pictures, other than CRT (Cathode Ray Tube), planar displays such as a liquid crystal display device, a plasma display panel and the like have frequently been used. Therefore, it is indispensable for information terminal devices in correspondence with multimedia to be provided with a function of receiving many kinds and many modes of picture sources and displaying them.

As representative methods for realizing the function, there are known a method of dealing with by display and a method of dealing with by signal processing. According to the former method, a picture is displayed by widely setting an operational range of a deflection system of a picture output device and performing a scanning operation in a mode in compliance with a signal format of input pictures, which has been reduced into practice as multi scan system. Although this is an effective method which can be realized at a comparatively low cost when a display unit is a CRT, it is difficult to apply in a planar display such as a liquid crystal display device, a plasma display panel or the like having a constant number of display picture elements.

According to the latter method, format conversion is performed by signal processing and pictures are displayed by converting inputted signals of pictures into signals of display formats of picture output devices, which can be applied to all the picture output devices such as a CRT, a liquid crystal display device, a plasma display panel and the like. Therefore, this is a method that is extremely effective in dealing with diversification of input picture sources or picture output devices predicted in the future. According to the method, various signal processing such as conversion of frame rate, compression and expansion of picture size and the like must be performed for format conversion.

For example, when a television signal of PAL system is converted into a television signal of NTSC system and displayed by a CRT or a liquid crystal display device, signal processing such as conversion of frame rate, conversion of number of scanning lines, conversion from interlace scanning into progressive scanning, conversion of aspect ratio or the like, compression and expansion, synchronizing and the like are performed independently each other. Further, memories having a comparatively large capacity such as a line memory, a frame memory are used in many of these signal processing operations. Accordingly, conventionally, a number of memories are needed in a total of signal processing and device cost is increased by using many memories. Further, a variety of input and output interfaces are needed between signal processing and therefore, processing for matching interfaces are often needed, which amounts to an increase in device cost.

Further, in each of signal processing, picture quality is slightly deteriorated, which is caused by, for example, quantization error by AD/DA conversion, band restriction by subjecting signals to a filter or the like. Such a picture quality deterioration is accumulated at each signal processing and the picture quality deterioration cannot be disregarded.

SUMMARY OF THE INVENTION

It is a principal object of the present invention to provide a method and a circuit for signal processing of format conversion of picture signal where deterioration of picture quality accompanied by signal processing of format conversion is inconsiderable, used memory capacity is extremely small and a reduction in fabrication cost is facilitated.

It is other object of the present invention to achieve the above object as well as to provide a signal processing circuit capable of converting a plurality of kinds of systems of input picture signals into signals of predetermined display formats of picture output devices.

In order to achieve the above-described object, according to an aspect of the present invention, there is provided a circuit for signal processing of format conversion of picture signal, comprising a scanning convertor for converting an input picture signal into a picture signal of progressive scanning when the input picture signal is of interlace scanning, a selector for selecting either one of the input picture signal and the picture signal of progressive scanning outputted from the scanning convertor, a scaling unit for performing signal processing of scaling in horizontal and vertical directions in respect of an output signal from the selector for format conversion and a control unit for selecting parameters of signal processing in accordance with a format of the input picture signal and a display format of a picture output device and controlling at least the scanning convertor, the selector and the scaling unit in accordance with the parameters of the signal processing.

Such a constitution is realized by commonly using memories in some signal processing, unifying combinations among signal processing by a common digital interface and a common signal system (progressive scanning system) and adopting a centralized control by the control unit.

Deterioration in picture quality is significantly improved by combining respective signal processing by signals of progressive scanning system. That is, many filtering processing are performed for picture signals in signal processing. In respect of many filters needed in such a picture processing, when progressive scanning system is compared with interlace scanning system, the degree of freedom of design is larger in the progressive scanning system and the filters can be realized with substantially ideal characteristics having high spatial frequencies. Therefore, deterioration in picture quality accompanied by signal processing in format conversion is significantly improved.

The scaling unit is provided with a horizontal scaling unit performing signal processing of the horizontal scaling and a vertical scaling unit performing signal processing of the vertical scaling. When a number of inputted horizontal picture elements of the input picture signal is larger than a number of horizontal picture elements of a displayed picture, the horizontal scaling is performed preferably prior to the vertical scaling and in the converse case, the vertical scaling is preferably performed prior to the horizontal scaling. Further, in the vertical scaling, other than signal processing of compression and expansion, also at least one of signal processing of frame rate conversion for system conversion (for example, PAL-NTSC conversion) of TV signals, signal processing for PAL 100 Hz, and signal processing of synchronization in multi windows such as double windows, a PIP (Picture In Picture; a small sub picture is displayed in a full main picture) display or the like, is performed. According to the constitution, compared with the case where signal processing of system conversion, compression, expansion, synchronization and the like are independently performed, a memory capacity necessary for signal processing of format conversion can significantly be reduced to one severalth of field (several mega bits).

Further, the circuit structure of each of horizontal scaling and vertical scaling is constituted by a combination of a calculation unit for multiplying a plurality of picture elements or picture elements of a plurality of lines by coefficient values, memories and a plurality of numbers of switches by which compression function, expansion function and through function are realized by switching signals by selectively controlling the switches. According to the calculation unit, linear interpolation process is performed. A plurality of kinds of processing can be performed by a same circuit through the technical means by which circuit scale necessary for signal processing can significantly be reduced.

According to a preferable embodiment of the present invention, the scanning convertor converts the input picture signal into a picture signal of progressive scanning by motion-adaptive process or motion compensative interpolation. Also, an output side of the scaling unit is provided with a picture quality improving unit for executing picture quality improving processing such as color space conversion or inverse gamma conversion to the picture signal which has been subjected to signal processing of format conversion.

As other preferable embodiment of the present invention, there is provided a multi processing unit for performing signal processing of multiplexing a first picture signal and a second picture signal of the same system (for example, NTSC television signals of interlace scanning) to a time-division multiplex signal during 1 scanning line period in which signal processing of format conversion is performed each for the first picture signal in one window and for picture signals outputted from the multi-processing unit in double windows. A further reduction in circuit scale necessary for signal processing can be achieved through the technical means.

As still other preferable embodiment of the present invention, as input picture signals, there are adopted component signals of 4:2:0 system comprising luminance signals and two color difference signals (a system where two color difference signals are divided to every other scanning lines and color signals are sampled at a rate of ½ of that of luminance signal) or 4:2:2 system (a system where both of two color difference signals are present on one scanning line and color difference signals are sampled at a rate of ½ of that of luminance signal). Various sources (for example, present TV signal, HDTV (High Definition Television) signal, EDTV (Extended Definition Television) signal, personal computer picture, package system picture and the like) can be processed in a unified manner through the technical means. Further, signal processing of two color difference signals can be performed by a memory capacity substantially the same as in luminance signal in the case of 4:2:2 system and a memory capacity of ½ of that of luminance signal in the case of 4:2:0 system.

Further, as still other preferable embodiment of the present invention, when an extremely high-speed operation is needed in signal processing (for example, when display is a high definition display or the like), a signal of progressive scanning is divided into two series of signals and signal processing of horizontal and vertical scaling for format conversion are performed to the two series of the signals. The signal processing can be performed at ½ operational speed through the technical means. Incidentally, the memory capacity necessary for the signal processing is substantially the same as in one series.

Further, an output side of the scaling unit is provided with a picture quality improving unit for executing picture quality improving processing such as color space conversion, inverse gamma conversion or the like in respect of the picture signal which has been subjected to signal processing of format conversion. According to the conventional technology, an accuracy of substantially 10 bits/picture element is needed for an output of the picture quality improving processing and therefore, it is necessary to adopt the accuracy of 10 bits/picture element in signal processing at and after the picture quality improvement. According to the present invention, the process of picture quality improvement is arranged after finishing signal processing of format conversion and therefore, respective signal processing after format conversion can be performed by a normal accuracy of 8 bits/picture element and accordingly, capacities of memories and circuit scale can be reduced.

These and other objects and many of the attendant advantages of the invention will be readily appreciated as the same becomes better understood by reference to the following detailed description when considered in connection with the accompanying drawings.

BRIEF DESCRIPTION OF THE DRAWINGS

FIG. 4A is a block diagram of a horizontal scaling unit 5 of FIG. 1;

FIG. 4B is an explanatory view of the operation of the horizontal scaling unit 5;

FIG. 5A is a block diagram of a vertical scaling unit 6 of FIG. 1;

FIG. 5B is an explanatory view of the operation of the vertical scaling unit 6;

FIG. 9 is a block diagram of a second embodiment of a format conversion circuit of picture signals according to the present invention;

FIG. 15A is an outline view of the operation of the multi processing unit 66 of FIG. 13 in double windows;

FIG. 15B is an outline view of the operation of the multi processing unit 66 of FIG. 13 in PIP display;

FIG. 16A is an outline view of signal processing at horizontal and vertical scaling units of FIG. 13;

FIG. 20A shows an equation of 4-3 line number conversion in FIG. 1;

FIG. 20B shows an equation of 3-4 line number conversion in FIG. 1;

FIG. 20C shows an equation of 6-5 line number conversion in FIG. 1;

FIG. 20D shows an equation of 5-6 line number conversion in FIG. 1;

FIG. 21 is an explanatory view of signal processing with an object of 525/60/1:1 (aspect 16:9) display;

FIG. 22 is an explanatory view of signal processing with an object of 625/100/2:1 (aspect 16:9) display; and FIG. 23 is an explanatory view of signal processing with an object of 1125/60/2:1 (aspect 16:9) display.

DETAILED DESCRIPTION OF THE PREFERRED EMBODIMENTS (Embodiment 1)

Figure 1:
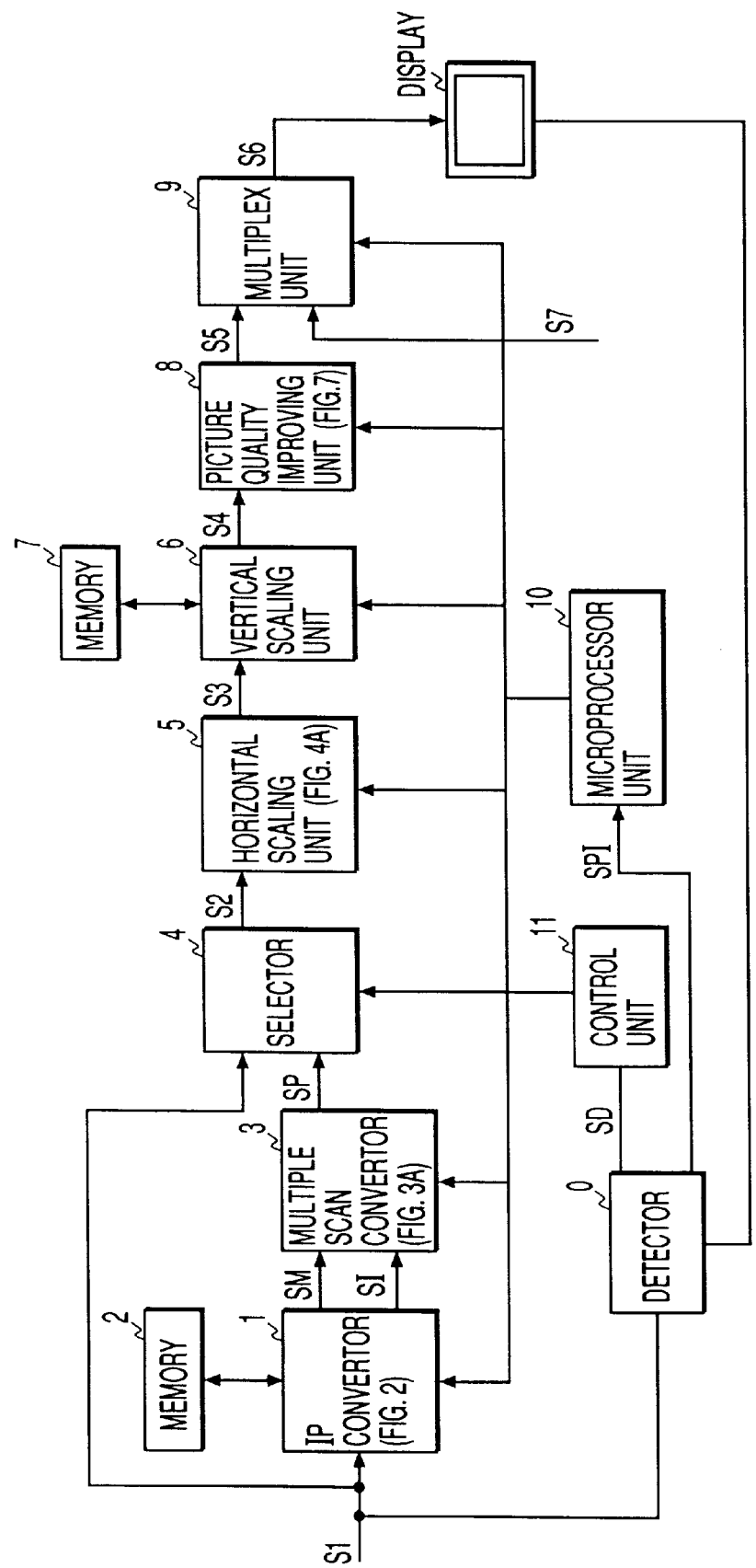
FIG. 1 is a block diagram of a first embodiment of a format conversion circuit of picture signals according to the present invention.

FIG. 1 is a block diagram showing a first embodiment of a format conversion signal processing circuit of picture signals according to the present invention. A detailed explanation will be given later of detailed structures of respective blocks in reference to drawings of numerals designating the blocks.

An Input picture signal S1 (comprising component luminance and color difference signals of 4:2:2 system or 4:2:0 system or the like) is inputted to an IP convertor 1 and a selector 4. The IP convertor 1, constituting a first convertor which is the front stage of the scanning convertor, forms a signal of scanning lines skipped in interlace scanning by motion-adaptive process or motion compensative interpolation in respect of the input picture signal of interlace scanning, and outputs a transmission scanning line signal SM transmitted in interlace scanning and an interpolation scanning line signal SI formed by the above-described interpolation. A multiple scan convertor 3, constituting the back stage of the scanning convertor, performs signal processing of ½ compression of time axis in the horizontal direction and time-division multiplex in respect of the signals SM and SI respectively and outputs a picture signal SP of progressive scanning. Thus the scanning convertor is formed with the IP convertor 1 and the multiple scan convertor 3.

A selector 4 is constituted by a switch circuit for selecting the signal SP when the input picture signal S1 is the present television (hereinafter, abbreviated as TV) signal of interlace scanning and the input picture signal S1 when the input picture signal S1 is an EDTV signal, a personal computer picture signal or a HDTV signal of progressive scanning, respectively and outputting the signal S1 or the signal SP as a signal S2.

A horizontal scaling unit 5 inputs the signal S2 of progressive scanning outputted from the selector 4, performs signal processing for converting K picture elements into L picture elements in respect of the horizontal direction of the picture (hereinafter, abbreviated as horizontal K-L conversion), and performs horizontal expansion (K<L) or horizontal compression (K>L) and outputs a converted signal S3. A vertical scaling unit 6 performs signal processing for converting K scanning lines into L scanning lines in respect of the vertical direction of the picture (hereinafter, abbreviated as vertical K-L conversion) and performs vertical expansion (K<L) or vertical compression (K>L). Further, depending on the input signals S1, system conversion (for example, system conversion between PAL system and NTSC system), signal processing of synchronization and signal processing of PAL 100 Hz when the field frequency of display is 100 Hz, are also performed. Further, a picture signal S4 with the format of which is converted, are outputted. Further, it is preferable in view of simplifying signal processing to provide the horizontal scaling unit 5 on the input side of the vertical scaling unit 6 when horizontal compression (K>L) is performed and provide the horizontal scaling unit 5 on the output side of the vertical scaling unit 6 when horizontal expansion (K<L) is performed.

A picture quality improving unit 8 inputs the picture signal S4 outputted from the vertical scaling unit 6 that is the final stage of format conversion, performs signal processing of picture quality improvement such as black stretching, white stretching or the like of luminance signals, color space conversion and the like and converts them into RGB signals of three primary colors. Further, signal processing of inverse gamma conversion is performed when a display is a linear property display. Further, a three primary colors picture signal S5 is outputted. A conventionally known one may be used for the picture quality improving unit 8.

A multiplex unit 9 performs signal processing for multiplexing another three primary colors picture signal S7 for multi pictures displaying (for example, double windows, PIP display, multi windows or the like) in respect of the signal S5. Further, a picture signal S6 in conformity with a format of a display is outputted.

A microprocessor unit 10 sets signal processing parameters based on a picture format signal SPI (information of kind of input picture signals S1, format of display, mode of picture display and the like) and controls the respective blocks 1, 3, 4, 5, 6, 8 and 9. The picture format signal SPI is automatically detected from a frame number, synchronization signal and the like of the input picture signal S1 and from the picture output device at a detector 0. The picture format signal SPI may naturally be generated manually.

A control unit 11 forms synchronization signal, control signal, clock signal and the like necessary for signal processing at the respective blocks and supplies them to the respective blocks. Further, information SD necessary for synchronizing processing in multi windows is outputted. That is, a control unit for generally controlling the respective blocks is constituted by the microprocessor unit 10 and the control unit 11.

An explanation will be given of the constitution of the principal blocks of FIG. 1 as follows.

Figure 2:
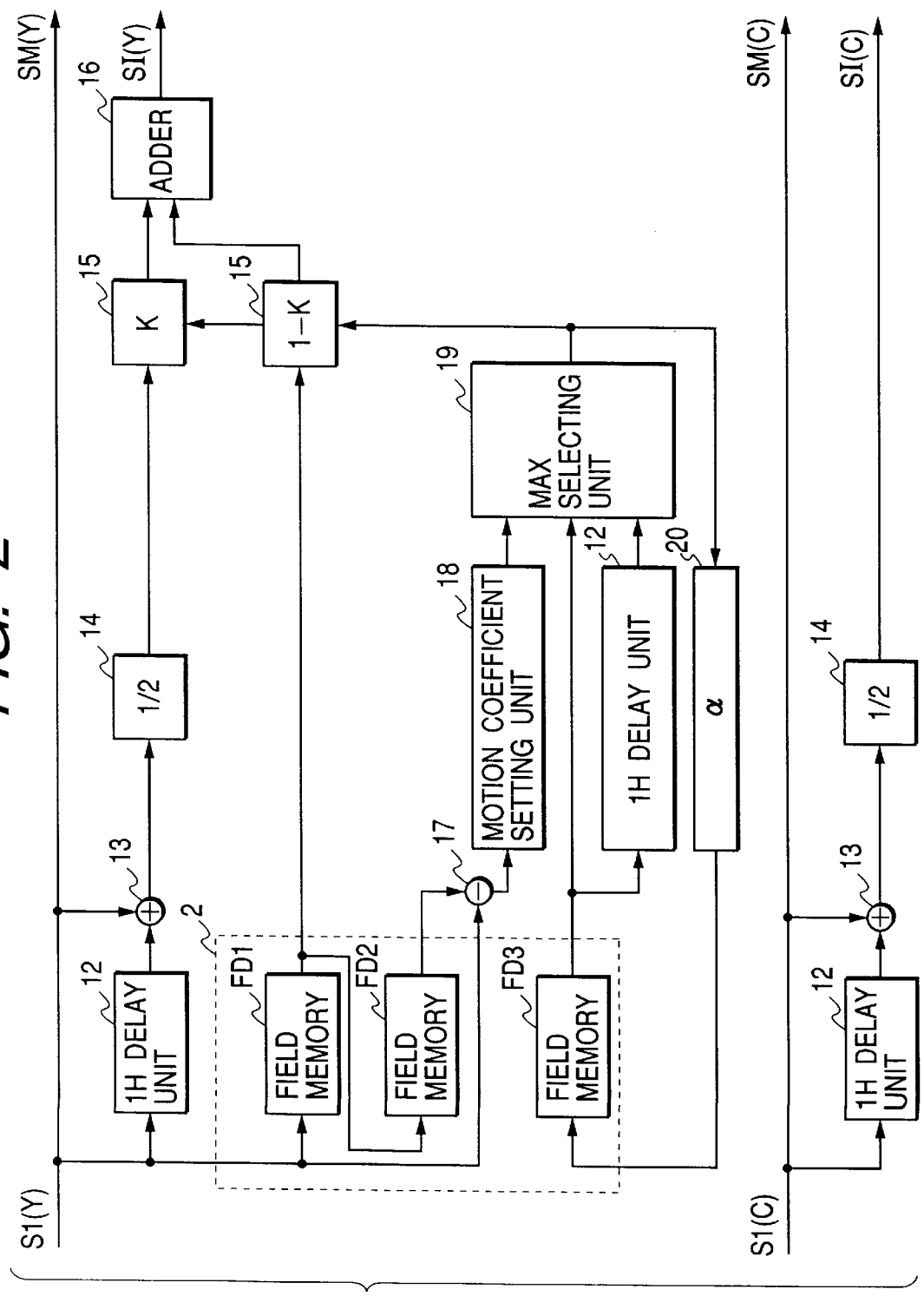
FIG. 2 is a block diagram of an IP convertor 1 of FIG. 1.

FIG. 2 is a view of a constitution example of the IP convertor 1 and a memory 2 of FIG. 1. Motion-adaptive interpolation is performed. The circuit is substantially the same as a conventionally known circuit.

A portion of luminance signal S1(Y) of the input picture signal S1 is outputted as a luminance signal SM(Y) of the transmission scanning line signal SM. Meanwhile, an interpolation signal suitable for moving picture is formed by adding at an adder 13 a signal delayed by 1H period at an 1H delay unit 12 (notation H designates a period of horizontal scanning line which remains the same in the following explanation) and multiplying a coefficient value ½ at a coefficient product unit 14.

Further, an interpolation signal suitable for stationary picture is formed by a signal delayed by 1 field period at a field memory FD1 in the memory 2. Further, a signal formed by delaying the signal by 1 field period at other field memory FD2, is subtracted at a subtracter 17 by which a differential signal at an interval of 1 frame is detected. A motion coefficient setting unit 18 sets a motion information coefficient having a value from 0 to 1 in accordance with an absolute value of the differential signal, that is, a magnitude of motion of picture. A MAX selecting unit 19 sets a final motion coefficient K by also using motion information of previous 1 field to avoid motion detection miss. That is, a maximum value is detected between a signal of motion of previous 1 field formed by delaying a signal at a field memory FD3 that are multiplied by a coefficient α (0<α<1) at a coefficient product unit 20 and the motion information coefficient, and the maximum value is outputted as the final motion coefficient K ($0 \leq K \leq 1$, stationary: K=0). Thus the MAX selecting unit 19 constitutes a motion detector. Coefficient product units 15 multiply the interpolation signal suitable for moving picture and the interpolation signal suitable for stationary picture by coefficients K and 1–K respectively, and an adder 16 forms a luminance signal SI(Y) of the interpolation scanning line signal SI by adding the both multiplied signals.

In respect of a color difference signal S1(C) of the input picture signal S1, interpolation signals are formed by intrafield interpolation. That is, the signal S1(C) is outputted as a color difference signal SM(C) of the transmission scanning line signal SM, and a color difference signal SI(C) of the interpolation scanning line signal SI is formed by adding a signal delayed by 1 line period in a 1H delay unit 12 to the color difference signal S1(C) at an adder 13 and multiplying the outputted signal from the adder by a coefficient value ½ at a coefficient product unit 14.

Incidentally, the bandwidth of each of two color difference signals u and v comprising the color difference signal S1(C) inputted to the above-described IP convertor 1 and selector 4 is ½ of the bandwidth of the luminance signal S1(Y). Therefore, when the input picture signal S1 is of 4:2:2 system, two sets of the circuit having the bandwidth of nearly ½ of the bandwidth of the luminance signal S1(Y) are prepared for processing the two signals u and v. For example, the circuit of the above-described IP convertor 1 has such a constitution. However, the circuit for the color difference signal S1(C) is not limited thereto but one set of a circuit can be prepared by using a color signal multiplex unit which multiplexes the two signals u and v into a time-division multiplex color signal. In this case, the bandwidth of the time-division multiplex color signal becomes double and nearly the same as the bandwidth of the luminance signal S1(Y). Therefore, the circuit for processing the time-division multiplex color signal forms one set of the circuit having nearly the same as the bandwidth of the luminance signal S1(Y). Thereby, the circuit for processing the time-division multiplex color signal can be simplified by reducing the number of circuits. The time-division multiplex color signal outputted from the color signal multiplex unit is inputted to the IP convertor 1 and the selector 4.

Figure 3A:
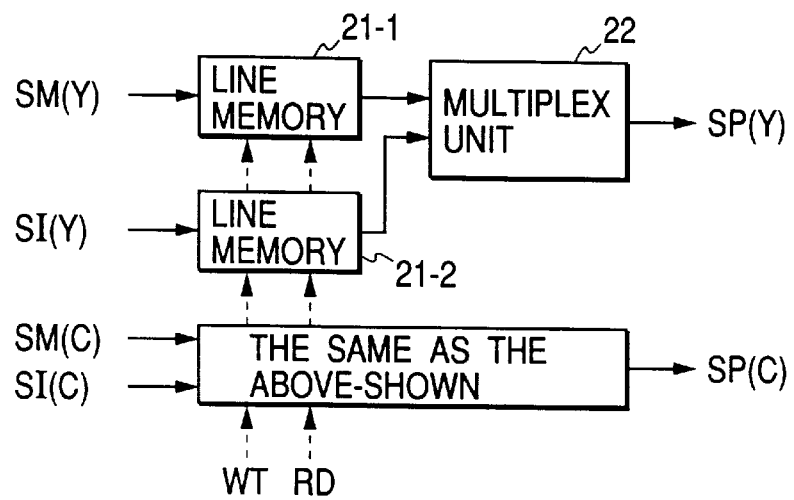
FIG. 3A is a block diagram of a multiple scan convertor 3 of FIG. 1.
Figure 3B:
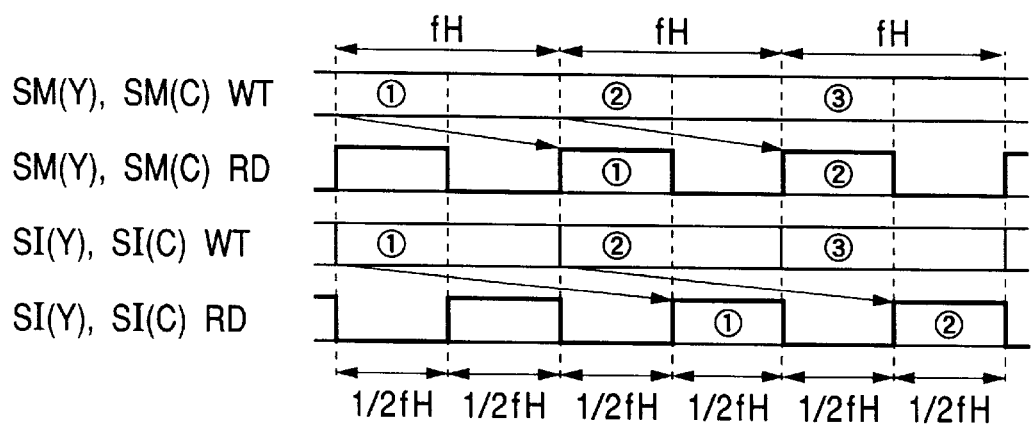
FIG. 3B is an explanatory view of the operation of the multiple scan convertor 3 of FIG. 1.

FIG. 3A and FIG. 3B are a view of the constitution of a multiple scan convertor 3 of FIG. 1 and a view for explaining the function of a line memory 21 of FIG. 3A, respectively.

The signals SM(Y) and SM(C) of the transmission scanning line signal SM are stored to line memories 21-1 respectively and the signals SI(Y) and SI(C) of the interpolation scanning line signal SI are stored to line memories 21-2 respectively for 1 line period at an operational speed of interlace scanning by a write operation (hereinafter, abbreviated as WT operation) shown by FIG. 3B.

According to a read operation (hereinafter, abbreviated as RD operation) from the line memories, the line memories 21-1 and 21-2 are alternately read in 1 line period (½fH) (½ time period of interlace scanning) successively at the operational speed of progressive scanning. Further, the signals from the line memories 21-1, 21-2 are multiplexed timesequentially at a multiplex unit 22 and a luminance signal SP(Y) and a color difference signal SP(C) of the signal SP of progressive scanning are provided as outputs thereof.

FIG. 4A and FIG. 4B are a view showing the constitution of the horizontal scaling unit 5 of FIG. 1 and a view showing signal processing parameters for performing selective control of switches in various signal processing, respectively.

According to signal processing of compression in a horizontal direction (hereinafter, abbreviated as horizontal compression), output lines of switches 24(SW1), 28(SW2) and 31(SW4) are connected to terminals "a" and an output line of a switch 30(SW3) is connected to a terminal "b". A luminance signal S2(Y) of the signal S2 of progressive scanning is subjected to band restriction by low pass frequency characteristic at a horizontal LPF 23 to remove horizontal high frequency components constituting an aliasing noise in compression processing. Next, linear interpolation process of horizontal K-L conversion (K>L) of picture elements is performed at a calculation unit constituted by a 1 picture element delay unit 25, coefficient product units 26 and an adder 27. That is, an input signal to the delay unit 25 and a signal delayed by 1 picture element by the delay element 25 are respectively multiplied by coefficient values $\beta$ and $1-\beta$ ($1>\beta \geq 0$) at the coefficient product units 26 and the both are added at the adder 27 thereby providing a signal of L picture elements formed from K picture elements by the horizontal K-L conversion. Further, the coefficient values $\beta$ and $1-\beta$ are changed at the respective picture elements with K picture elements as a period. The signal of L picture elements is stored to a 1H memory 29 by intermittent WT operation. Further, a signal from the memory 29 is read continuously by RD operation. A signal S3(Y) of the signal S3 which has been subjected to horizontal compression by a multiplication factor of L/K is provided as the output from the switch 31.

According to signal processing of expansion in a horizontal direction (hereinafter, abbreviated as horizontal expansion), the output lines of the switches 24(SW1) and 28(SW2) are connected to terminals "b" and the output lines of the switches 30(SW3) and 31(SW4) are connected to the terminals "a". The luminance signal S2(Y) of progressive scanning is continuously stored to the 1H memory 29 by WT operation. Further, in RD operation, repetition RD operation is performed at portions of period and a signal of K of picture elements is read in a period of L picture elements. Linear interpolation process of K-L conversion (K<L) of picture elements is performed by the calculation unit constituted by the 1 picture element delay unit 25, the coefficient product units 26 and the adder 27. That is, an input signal to the delay unit 25 and a signal delayed by 1 picture element at the delay unit 25 are multiplied by the coefficient values $\beta$ and $1-\beta$ at the coefficient product units 26 and the both are added at the adder 27 thereby providing a signal of L picture elements formed from K picture elements by K-L conversion. Incidentally, the coefficient values $\beta$ and $1-\beta$ are changed at the respective picture elements with L picture elements as a period. A signal S3(Y) of the signal S3 which has been subjected to horizontal expansion by a multiplication factor of L/K is provided as the output from the switch 31(SW4). Further, as mentioned above, in respect of signal processing of horizontal expansion, it is preferable to provide the horizontal scaling unit 5 on the output side of the vertical scaling unit 6.

Through processing is performed when horizontal compression or expansion is not needed in which the switch 31 is connected to the terminal "b" and the input signal S2(Y) is provided at the output of the switch 31 as a signal S3(Y) of the signal S3 which has not been subjected to compression or expansion processing.

Also in respect of a color difference signal S2(C) of the signal S2 of progressive scanning, signal processing by the constitution the same as in the case of the luminance signal S2(Y) is performed thereby providing a color difference signal S3(C) the signal S3 which has been subjected to horizontal compression, horizontal expansion or through.

Figure 6A:
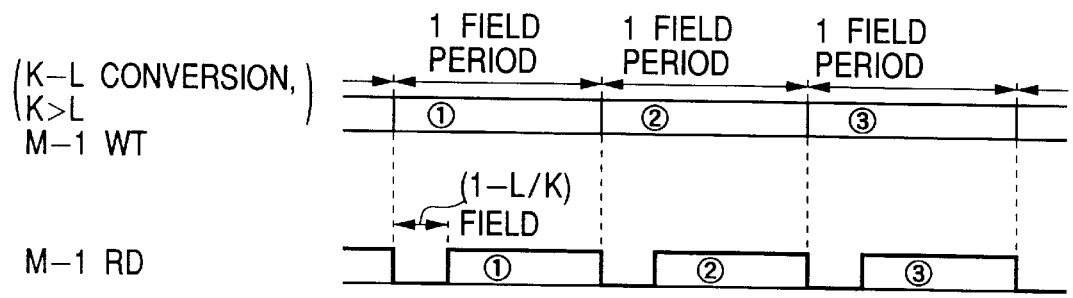
FIG. 6A is an outline view of the operation of a memory in the case of a vertical compression processing of the vertical scaling unit 6 of FIG. 1.

FIG. 5A and FIG. 5B are a view showing the constitution of the vertical scaling unit 6 of FIG. 1 and a view showing signal processing parameters of selective control of switches in various signal processing, respectively. According to signal processing of compression in a vertical direction (hereinafter, abbreviated as vertical compression), output lines of switches 33(SW1), 37(SW2) and 39(SW4) are connected to terminals "a" and an output line of switch 38(SW3) is connected to a terminal "b", respectively. The luminance signal S3(Y) of picture signal of progressive scanning is subjected to band restriction of low pass frequency characteristic at a vertical LPF 32 to remove vertical high frequency components constituting an aliasing noise in compression processing. Linear interpolation process of vertical K-L conversion (K>L) of lines is performed by a calculation unit constituted by a 1 line delay element 34, coefficient product units 35 and an adder 36. That is, an input signal to the memory unit 34 and a signal delayed by 1 line at the memory unit 34 are multiplied by coefficient values $\beta$ and $1-\beta$ at the coefficient product units 35 and the both are added at the adder 36 thereby providing a signal of L lines formed from K lines by vertical K-L conversion as the output. Incidentally, the coefficient values $\beta$ and $1-\beta$ are changed at the respective lines with K lines as a period. As shown by FIG. 6A, at a memory M-1 in a memory 7, WT operation and RD operation are performed with 1 field period as a period. In WT operation, the signal formed by vertical K-L conversion is intermittently written and stored. Meanwhile, in RD operation, a signal from the memory M-1 is read continuously from time point delayed by $(1-L/K)$ field period. Thus, a signal S4(Y) of the signal S4 which has been subjected to vertical compression by a multiplication factor of L/K is provided as the output from the switch 39(SW4). As memory capacity necessary for signal processing of vertical compression as described above, a capacity for $(1-L/K)$ field period is sufficient.

Figure 6B:
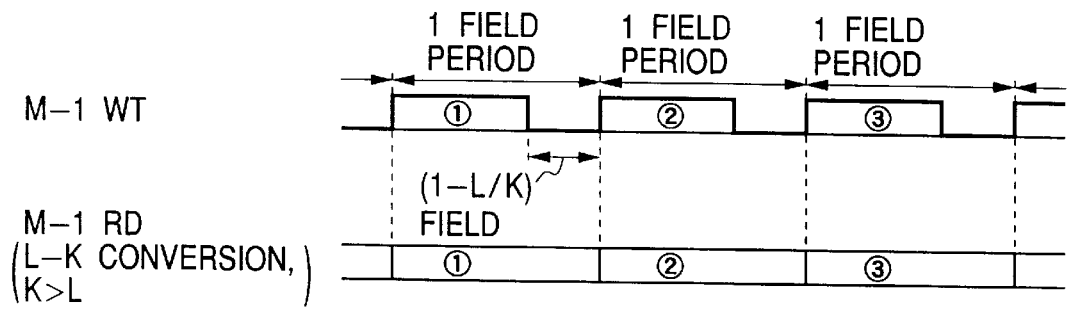
FIG. 6B is an outline view of the operation of a memory in the case of a vertical expansion processing of the vertical scaling unit 6 of FIG. 1.

According to signal processing of expansion in a vertical direction (hereinafter, abbreviated as vertical expansion), the output lines of the switches 33(SW1) and 37(SW2) are connected to the terminals "b" and the output lines of the switches 38(SW3) and 39(SW4) are connected to the terminals "a", respectively. In the memory M-1, WT operation and RD operation are performed with 1 field period as one period as shown by FIG. 6B. The luminance signal S3(Y) of progressive scanning is stored continuously by WT operation. Meanwhile, with respect to RD operation, repetition RD operation is performed at portions of period and a signal of L lines is read in a period of K lines. Next, linear interpolation process of vertical L-K conversion (L<K) of lines is performed by the calculation unit constituted by the 1 line delay element 34, the coefficient product units 35 and the adder 36. That is, an input signal to the memory unit 34 and a signal delayed by 1 line at the memory unit 34 are multiplied by the coefficient values $\beta$ and $1-\beta$ at the coefficient product units 35 and the both are added at the adder 36 thereby providing a signal of K lines formed from L lines by L-K conversion as the output. Incidentally, the coefficient values $\beta$ and $1-\beta$ are changed at the respective lines with K lines as a period. Thus, a signal S4(Y) of the signal S4 which has been subjected to vertical expansion at a multiplication factor K/L is provided as the output from the switch 39(SW). As memory capacity necessary for signal processing of vertical expansion as described above, a capacity of (1−L/K) field period is sufficient.

Figure 6C:
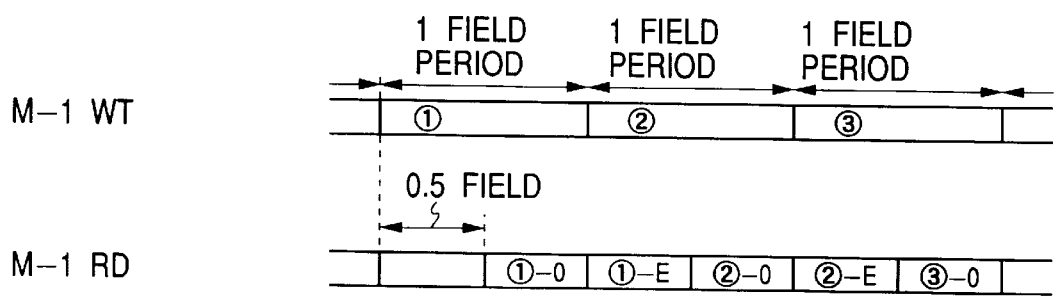
FIG. 6C is an outline view of the operation of a memory in the case of PAL 100 Hz of the vertical scaling unit 6 of FIG. 1.

Signal processing of PAL 100 Hz is for converting a signal having the field frequency of 50 Hz to a signal of interlace scanning of 100 Hz (hereinafter, abbreviated as 625/100/2:1) to remove flickers of PAL television system converted into progressive scanning (hereinafter, abbreviated as 625/50/1:1). The processing is realized by connecting the output lines of the switches 37(SW2) and 38(SW3) to the terminals "b" and connecting the output line of the switch 39(SW4) to the terminal "a". In the memory M-1, WT operation and RD operation as shown by FIG. 6C are performed. The luminance signal S3(Y) of the PAL signal of progressive scanning is continuously stored by WT operation with 1 field period as a period. Meanwhile, in RD operation, a signal from the memory M-1 is read in the order of a signal of odd number scanning lines of progressive scanning (designated by ○-0 in FIG. 6C) and a signal of even number scanning lines (designated by ○-E in FIG. 6C) from time point delayed by 0.5 field period. Thus, a signal S4(Y) of the signal S4 of PAL 100 Hz is provided as the output from the switch 39(SW4). As memory capacity necessary for signal processing of PAL 100 Hz described above, the capacity of 0.5 field period is sufficient.

Figure 6D:
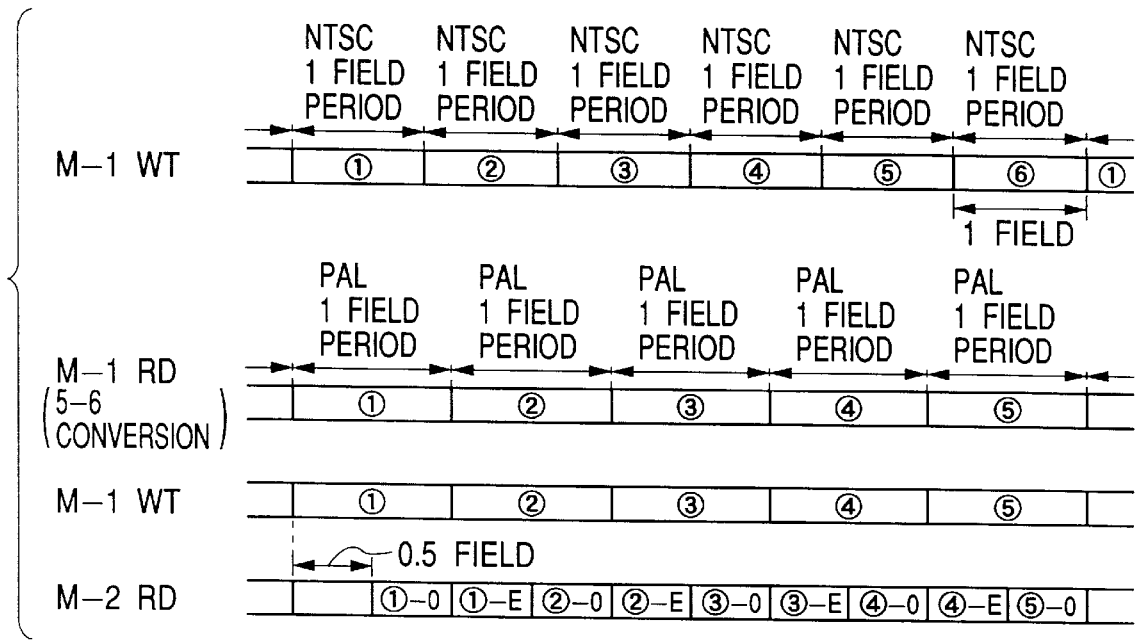
FIG. 6D is an outline view of the operation of a memory in the case of NTSC-PAL 100 Hz of the vertical scaling unit 6 of FIG. 1.

According to signal processing of NTSC-PAL 100 Hz, a NTSC signal converted into progressive scanning (hereinafter, abbreviated as 525/60/1:1) is converted into a signal of 625/100/2:1 system. The processing is realized by connecting the output lines of the switches 33(SW1) and 37(SW2) to the terminals "b", the output line of the switch 38(SW3) to a terminal "c" and the output line of the switch 39(SW4) to the terminal "a", respectively. As shown by FIG. 6D, the luminance signals S3(Y) of the NTSC signal of progressive scanning is stored continuously to the memory M-1 by WT operation with NTSC 1 field period as a period. Meanwhile, in RD operation, repetition RD operation is performed at portions of period with PAL 1 field period as a period by which a signal of 5 lines is read in a time period of 6 lines.

Next, vertical expansion is performed by linear interpolation process of 5-6 line number conversion by the calculation unit constituted by the 1 line memory unit 34, the coefficient product units 35 and the adder 36. That is, an input signal to the memory unit 34 and a signal delayed by 1 line at the memory unit 34 are multiplied by the coefficient values β and 1−β at the coefficient product units 35 and both are added at the adder 36 thereby providing a signal of 6 lines formed from 5 lines by 5-6 line number conversion as the output. Incidentally, the coefficient values β and 1−β are changed at the respective lines with 6 lines as a period. At a memory M-2 of the memory 7, the signal outputted from the adder 36 and supplied to the memory M-2 is stored continuously by WT operation with PAL 1 field period as a period. Meanwhile, in RD operation, a signal outputted from the memory M-2 is read in the order of a signal of odd number scanning lines (○-0 in FIG. 6D) and a signal of even number scanning lines (○-E in FIG. 6D) from time point delayed by 0.5 field period. Thus, a signal S4(Y) of the signal S4 of NTSC-PAL 100 Hz is provided as the output from the switch 39(SW4). As memory capacity necessary for signal processing of NTSC-PAL 100 Hz as described above, a capacity of 1 field period for NTSC-PAL conversion and 0.5 field period for field multiple scan conversion is sufficient.

Figure 6E:
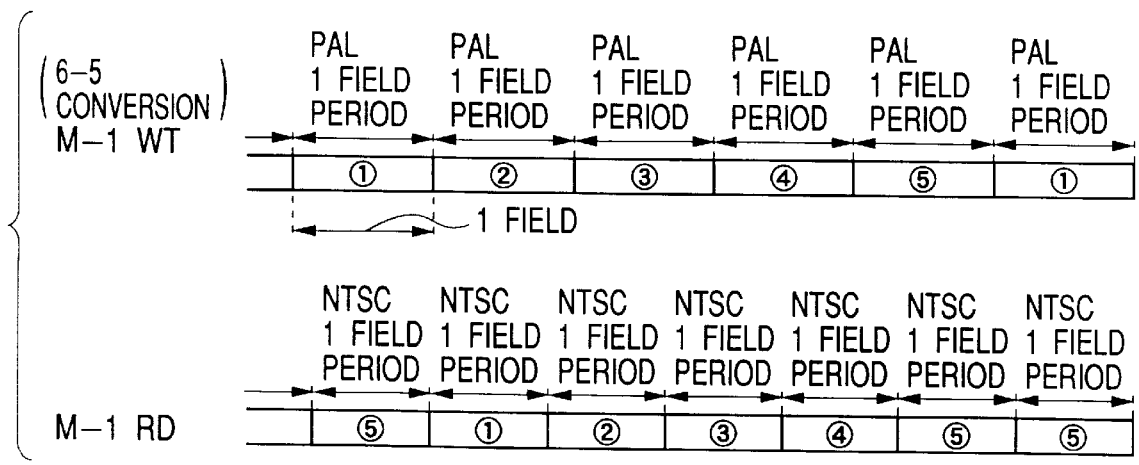
FIG. 6E is an outline view of the operation of a memory in the case of PAL-NTSC conversion processing of the vertical scaling unit 6 of FIG. 1.

According to signal processing of PAL-NTSC conversion, a signal of 625/50/1:1 system is converted into a signal of 525/60/1:1 system in which the output lines of the switches 33(SW1) and 37(SW2) are connected to the terminals "a", the output line of the switch 38(SW3) is connected to the terminal "b" and the output line of the switch 39(SW4) is connected to the terminal "a", respectively. The luminance signal S3(Y) of PAL system of progressive scanning is subjected to band restriction by low pass frequency characteristic at the vertical LPF 32. Next, vertical compression is performed by linear interpolation process of 6-5 line number conversion by the calculation unit constituted by the 1 line memory unit 34, the coefficient product units 35 and the adder 36. That is, an input signal to the memory unit 34 and a signal delayed by 1 line at the memory unit 34 are multiplied by the coefficient values β and 1−β at the coefficient product units 35 and both are added at the adder 36 thereby providing a signal of 5 lines formed from 6 lines by 6-5 line number conversion as the output. Incidentally, the coefficient values β and 1−β are changed for the respective lines with 6 lines as a period. As shown by FIG. 6E, at the memory M-1 a signal formed by 6-5 line number conversion is intermittently written and stored by WT operation with PAL 1 field period as a period. Meanwhile, a signal outputted from the memory M-1 is read in RD operation with NTSC 1 field period as a period. Thus, a signal S4(Y) of the signal S4 which has been subjected to PAL-NTSC conversion is provided as the output from the switch 39(SW4). As memory capacity necessary for signal processing of PAL-NTSC conversion as described above, a capacity of 1 field period is sufficient.

Through processing is performed when processing of vertical compression or expansion is not needed in which the output line of the switch 39(SW4) is connected to the terminal "b" and a signal S4(Y) of the signal S4 which has not been subjected to processing of compression or expansion is provided as the output from the switch 39.

Also in respect of the color difference signal S3(C) of picture signal of progressive scanning, signal processing by the constitution the same as in the luminance signal is performed thereby providing a signal S4(C) of the signal S4 of vertical compression, vertical expansion, PAL 100 Hz, NTSC-PAL 100 Hz, PAL-NTSC conversion or through processing. Incidentally, the parameters and the coefficients of signal processing for driving the switches in FIG. 4A, FIG. 4B and FIG. 5A and FIG. 5B are provided from the microprocessor of FIG. 1. The same goes with other embodiments shown below.

As described above, according to the vertical scaling unit, various signal processing necessary for format conversion can be carried out with an extremely small memory capacity.

Figure 19A:
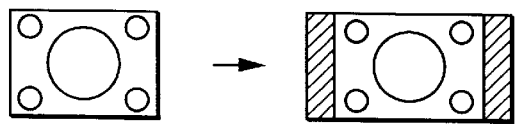
FIG. 19A is a view of picture where a format is converted into horizontal compression (normal mode)
Figure 19B:
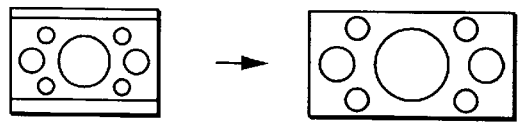
FIG. 19B is a view of picture where a format is converted into vertical expansion (cinema mode)
Figure 19C:
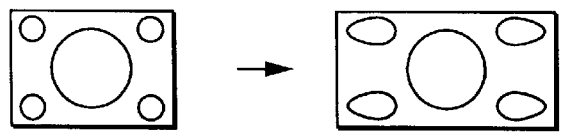
FIG. 19C is a view of picture where a format is converted into smooth wide.
Figure 19D:
FIG. 19D is a view of picture where a format is converted into squeeze (full mode)
Figure 19E:
FIG. 19E is a view of picture where a format is converted into horizontal and vertical flexible compression.
Figure 19F:
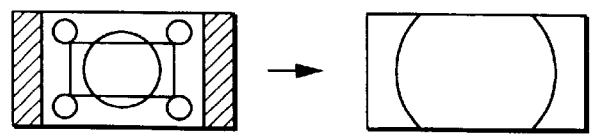
FIG. 19F is a view of picture where a format is converted into horizontal and vertical flexible expansion.

FIG. 19A through FIG. 19F show pictures of representative examples in format conversion of picture signal. In FIG. 19A, a picture is horizontally compressed to display a picture of aspect ratio of 4:3 on a display screen of aspect ratio of 16:9, which is referred to as normal mode. In FIG. 19B, a picture is vertically expanded to display a letter box picture in a screen of aspect ratio of 16:9, which is referred to as cinema mode. In FIG. 19C, the left and right corner areas of a picture of aspect ratio of 4:3 are gradually expanded and are displayed in a full screen of aspect ratio of 16:9, which is referred to as smooth wide. In FIG. 19D, picture of aspect ratio of 4:3 compressed horizontally is displayed in a full screen of aspect ratio of 16:9, which is referred to as full mode. In FIG. 19E, picture is displayed by compressing in the horizontal and the vertical directions by an arbitrary magnification. Further, in FIG. 19F, picture is displayed by expanding in the horizontal and vertical directions by an arbitrary magnification (referred to as zoom mode).

FIG. 20A through FIG. 20D show equations of representative processing of K-L conversion used in signal processing of format conversion.

4-3 conversion of FIG. 20A is used in normal mode. A matrix shown in FIG. 20A indicates a corresponding relationship between 4 points of input series X1, X2, X3 and X4, and 3 points of output series Y1, Y2 and Y3. Therefore, in the above-described calculation unit, the coefficient values ($\beta$, 1–$\beta$) are changed to (1, 0), (2/3, 1/3), (1/3, 2/3) thereby forming the output series. 3-4 conversion of FIG. 20B is used in cinema mode. A matrix in FIG. 20B indicates a corresponding relationship between 4 points of input series X1, X2, X3 and X4 (incidentally, X4 is used also for X1 of next input series), and 4 points of output series Y1, Y2, Y3 and Y4. Therefore, in the above-described calculation unit, the coefficient values ($\beta$, 1–$\beta$) are changed to (0, 1), (1/4, 3/4), (2/4, 2/4), (3/4, 1/4) thereby forming the output series. Further, FIG. 20C shows an example of 6-5 conversion used in PAL-NTSC conversion and FIG. 20D shows an example of 5-6 conversion used in NTSC-PAL conversion.

FIG. 21 shows signal processing at the IP convertor 1, the horizontal and vertical scaling units 5 and 6 with an object of display of a picture signal (526/60/1:1) and aspect ratio of 16:9. In FIG. 21, circle mark in IP conversion represents an operation of carrying out IP conversion.

In respect of the input signal S1 of 525/60/2:1 system (corresponding to present NTSC system), format conversion in correspondence with various display modes is carried out to the signal converted to progressive scanning at the IP convertor 1.

In respect of the input signal S1 of 525/60/1:1 system (corresponding to EDTV system), the IP conversion is not carried out since it is progressive scanning and through processing, expansion and compression are carried out in accordance with display modes.

In respect of the input signal S1 of 1125/60/2:1 system (corresponding to HDTV) 17-16 conversion is carried out at the vertical scaling unit 6 and the input signal is converted from interlace scanning to progressive scanning. Further, processing of expansion and compression are carried out in accordance with display modes.

In respect of the input signal S1 of 625/50/2:1 system (corresponding to present PAL system), frame rate conversion and 6-5 line number conversion are carried out at the vertical scaling unit 6 to the signal converted into progressive scanning at the IP convertor 1. Also, format conversion in correspondence with various display modes is carried out.

The input signal S1 of PC system (personal computer picture) is of progressive scanning of 60 frames/second and therefore, the IP conversion is not carried out and processing of normal mode display is performed at horizontal and vertical scaling units 5 and 6. That is, in VGA system (640×480), horizontal 4-3 line number conversion is performed, in SVGA system (800×600), horizontal 4-3 line number conversion and vertical 5-4 line number conversion are performed and in XGA system (1024×768), horizontal 4-3 line number conversion and vertical 8-5 line number conversion are performed.

FIG. 22 shows signal processing at the IP convertor 1, the horizontal and the vertical scaling units 5 and 6 with an object of display of 625/100/2:1 and aspect ratio of 16:9.

In respect of the input signal S1 of 525/60/2:1 system (corresponding to present NTSC system), frame rate conversion, 5-6 line number conversion and field multiple scan conversion are performed at the vertical scaling unit 6 to the signal converted into progressive scanning at the IP convertor 1. Also, format conversion in correspondence with various display modes is performed.

In respect of the input signal S1 of 525/60/1:1 system (corresponding to EDTV system), the IP conversion is not carried out since it is progressive scanning and frame rate conversion, 5-6 line number conversion and field multiple scan conversion are performed at the vertical scaling unit 6. Further, processing of through, expansion and compression are performed in accordance with display modes.

In respect of the input signal S1 of 1125/60/2:1 system (corresponding to HDTV), frame rate conversion, 15-16 line number conversion and field multiple scan conversion are performed at the vertical scaling unit 6. Further, processing of expansion and compression are performed in accordance with display modes.

In respect of the input signal S1 of 625/50/2:1 system (corresponding to present PAL system), field multiple scan conversion is performed at the vertical scaling unit 6 to the signal converted into progressive scanning at the IP convertor 1. Further, format conversion in correspondence with various display modes is performed.

The input signal of PC system (personal computer picture) is of progressive scanning of 60 frames/second and therefore, the IP conversion is not carried out and frame rate conversion and field multiple scan conversion are performed at the vertical scaling unit 6. Further, processing for normal mode display is performed. That is, in VGA system (640×480), horizontal 4-3 line number conversion and vertical 5-6 line number conversion are performed, in SVGA system (800×600), horizontal 4-3 line number conversion is performed and in XGA system (1024×768), horizontal 4-3 line number conversion and vertical 4-3 line number conversion are performed.

FIG. 23 shows signal processing at the IP convertor and the horizontal and vertical scaling units with an object of display of 1125/60/2:1 and aspect ratio of 16:9.

In respect of the input signal S1 of 525/60/2:1 system (corresponding to present NTSC system), format conversion in correspondence with various display modes is carried out to the signal converted into progressive scanning at the IP convertor 1. Further, 16-17 line number conversion is also carried out at the vertical scaling unit 6 and the signal inputted to the unit 6 is converted into a signal of interlace scanning.

In respect of the input signal S1 of 525/60/1:1 system (corresponding to EDTV system), the IP conversion is not carried out since it is progressive scanning and processing of through, expansion and compression are performed in accordance with display modes. Incidentally, 16-17 line number conversion is also carried out at the vertical scaling unit 6 and the signal inputted to the unit 6 is converted into a signal of interlace scanning.

In respect of the input signal S1 of 1125/60/2:1 system (corresponding to HDTV), processing of expansion and compression are carried out in accordance with display modes.

In respect of the input signal S1 of 625/50/2:1 system (corresponding to present PAL system), frame rate conversion and 16-15 line number conversion are carried out at the vertical scaling unit 6 to the signal converted into progressive scanning at the IP convertor 1 and the signal inputted to the unit 6 is converted into a signal of interlace scanning. Also, format conversion in correspondence with various display modes is performed.

The input signal of PC system (personal computer picture) is of progressive scanning of 60 frames/second and accordingly, the IP conversion is not performed and a processing of normal mode display is performed at the horizontal and vertical scaling unit 5 and 6. That is, in VGA system (640×480), horizontal 4-3 line number conversion and vertical 16-17 line number conversion are performed, in SVGA system (800×600), horizontal 4-3 line number conversion and vertical 20-17 line number conversion are performed and in XGA system (1024×768), horizontal 4-3 line number conversion and vertical 32-21 line number conversion are performed.

Figure 7:
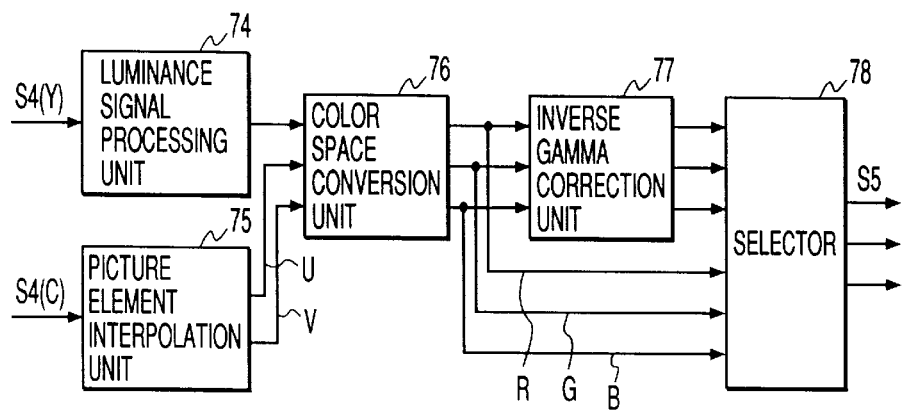
FIG. 7 is a block diagram of a picture quality improving unit 8 of FIG. 1.

Next, FIG. 7 shows an example of the constitution of the picture quality improving unit 8 of FIG. 1. The luminance signal S4(Y) of picture signal, which has been subjected to format conversion processing, is inputted to a luminance processing unit 74 where signal processing of image enhancer, black stretching and white stretching are carried out. Further, the color difference signal S4(C) of picture signal which has been subjected to format conversion is inputted to a picture element interpolation unit 75 where signal processing for demodulating the color signal S4(C) into color difference signals U and V having the structure of sample point the same as in the luminance signal. A color space convertor 76 carries out conversion processing from a luminance and color difference system to a three primary colors RGB system. Further, an inverse gamma processing unit 77 carries out signal processing of inverse gamma correction for a display having a linear characteristic. A selector 78 selects a signal from the color space convertor in a display having a gamma characteristic as in CRT or the like and selects a signal from the inverse gamma processing unit 77 in a display having a linear characteristic as in a liquid crystal display device or a plasma display panel and outputs them as three primary color image signals S5.

As mentioned in the above embodiment, according to the present invention, a method and a circuit for signal processing of format conversion of picture signal having inconsiderable deterioration of picture quality accompanied by signal processing and an extremely small memory capacity for use at low cost, can be realized.

Figure 8:
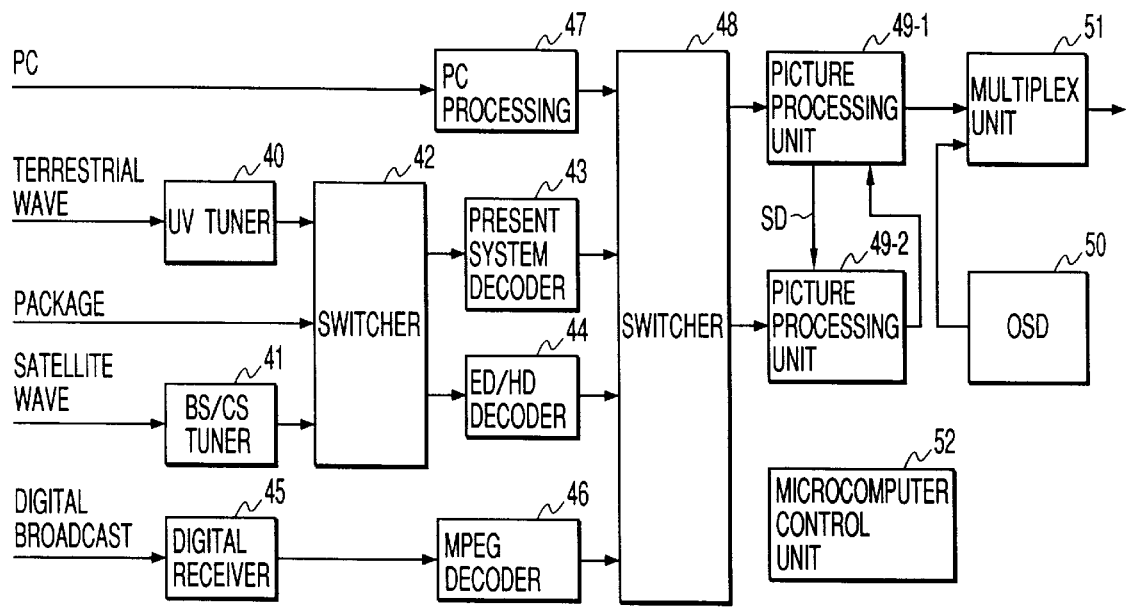
FIG. 8 is a view of an embodiment of a TV receiver using a format conversion circuit of picture signals according to the present invention.

Further, FIG. 8 shows an embodiment of a television receiver using a circuit for signal processing of format conversion of picture signal according to the embodiment. Respective blocks shown in FIG. 8 and a picture output device (not illustrated) are integrated into a television receiver. A conventionally known one may be used for the picture output device.

Terrestrial broadcast wave is received by a UV tuner 40 and demodulated into a picture signal of base band. Satellite broadcast wave is received by a BS/CS tuner 41 and is demodulated into a picture signal of base band. Further, a switcher 42 selects and outputs one from the demodulated picture signals and picture signals of the package (CD-ROM, video tape) systems.

A present system decoder 43 performs signal processing of YC (luminance and color) separation and color demodulation in respect of a picture signal of NTSC system or PAL system and demodulates the signal into luminance and color difference signals of component 4:2:2 system (or 4:2:0 system). An ED/HD decoder 44 performs signal processing of demodulation in respect of a picture signal of EDTV system or HDTV system and demodulates the signal into luminance and color difference signals of progressive scanning in EDTV system or component 4:2:2 system (or 4:2:0 system) of interlace scanning in HDTV system.

Digital broadcast wave is received by a digital receiver 45 and is demodulated into a bit stream signal by performing signal processing of descramble, error correction and the like. The bit stream signal is demodulated into luminance and color difference signals of component 4:2:2 system (or 4:2:0 system) by performing demodulation processing at an MPEG decoder 46.

A PC picture signal (three primary colors RGB signal) is inputted to a PC processing unit 47 and converted into luminance and color difference signals of component 4:2:2 system (or 4:2:0 system) by performing signal processing of color space conversion to luminance and color difference system.

A switcher 48 selects and outputs these signals.

A picture processing unit 49-1 performs signal processing of converting a picture signal into a format of a display in the format conversion signal processing circuit of picture signals shown by FIG. 1. In one window mode, a signal from the picture processing unit 49-1 is outputted and in multi windows mode, signals formed by multiplexing the signal from the picture processing unit 49-1 as a main picture with a signal as a sub picture from a picture processing unit 49-2 where synchronizing with the main picture is carried out by the information SD.

A multiplex unit 51 performs processing of multiplexing on screen pictures formed by OSD (On Screen Display) 50 (means for forming small other picture in one picture in case of forming pictures of personal computer or the like) to the signal, supplies the output signal to a picture output device (not illustrated in the drawings). In the picture output device, the picture whose format is converted to a predetermined display format is displayed.

A microcomputer control unit 52 sets the input signals or display modes, controls signal processing at respective blocks and the like. Incidentally, connections between the microcomputer control unit 52 and the respective blocks are omitted.

As mentioned above, by adopting the format conversion signal processing circuit of the present invention, a television receiver for receiving and displaying picture signals from various input sources can be realized at low cost by reducing necessary memories. Incidentally, in respect of the picture processing unit 49, it may also be constituted in a second through a fourth embodiment mentioned below. Further, in the following explanation of embodiments, the same numerals are attached to constitutions or function portions substantially the same as those in the first embodiment and an explanation thereof will be omitted.

(Embodiment 2)

FIG. 9 shows a second embodiment of a format conversion signal processing circuit of picture signal according to the present invention. According to the embodiment, signal processing at horizontal and vertical scaling units is performed under a state of two series of signals of interlace scanning and thereafter, the signals are converted into a signal of progressive scanning. That is, an input picture signal is divided into two series and signal processing of horizontal and vertical scaling units is performed to each of the divided signals.

The input picture signal S1 (comprising component luminance and color difference signals of 4:2:2 system or 4:2:0 system) is inputted to the IP convertor 1 and a 2 channel division unit 53. The IP convertor 1 operates to the input picture signal S1 of interlace scanning and is provided with the constitution and operation the same as those shown by FIG. 2. The 2 channel division unit 53 forms two series of signals SM' and SI' of interlace scanning from the input picture signal S1 of progressive scanning. The 2 channel division unit constitutes a second convertor. The selector 4 selects respectively the signals SM and SI when the input picture signal S1 is the present TV signal of interlace scanning and the signals SM' and SI' when the signal S1 is the EDTV signal, the personal computer picture signal or the HDTV signal of progressive scanning and outputs the selected signals as signals S2M and S2I.

The horizontal scaling units 5 perform horizontal expansion (K<L) or horizontal compression (K>L) by signal processing of horizontal K-L conversion for each of the signals S2M and S2I and output signals S3M and S3I expanded or compressed in the horizontal direction. A vertical scaling unit 54 performs vertical expansion (K<L) or vertical compression (K>L) by signal processing of vertical K-L conversion to the signals S3M and S3I. Further, depending on the kind of the input signal S1, similar to Embodiment 1, signal processing of system conversion (for example, PAL-NTSC conversion) or synchronization is performed and depending on a display, signal processing of PAL 100 Hz is performed along therewith. Further, signals S4M and S4I the format of each of which is converted are outputted.

The multiple scan convertor 3 performs signal processing of ½ compression of time axis and time-division multiplex in the horizontal direction for each of the signals S4M and S4I and outputs a picture signal S4 of progressive scanning.

Figure 10A:
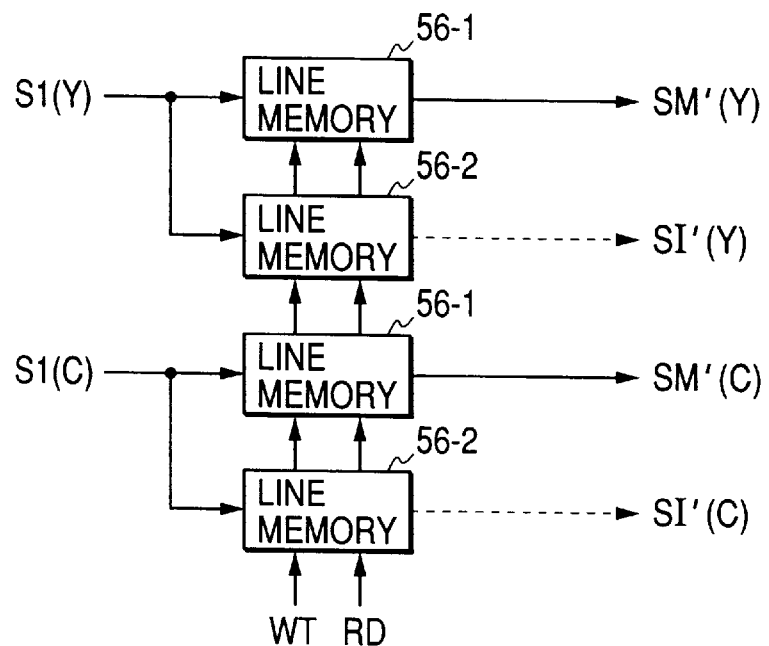
FIG. 10A is a block diagram of a 2 channel division unit 53 of FIG. 9.
Figure 10B:
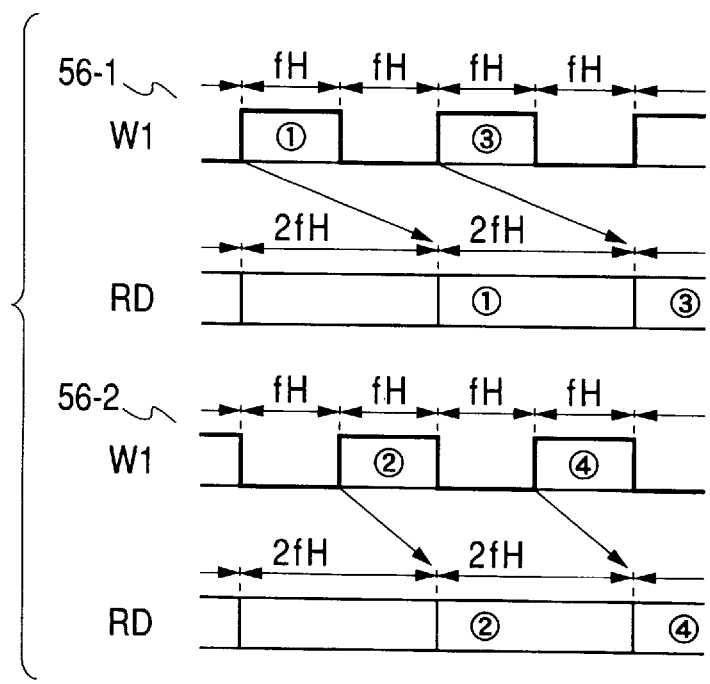
FIG. 10B is an explanatory view of the operation of the 2 channel division unit 53 of FIG. 9.

FIG. 10A and FIG. 10B are a block diagram of the 2 channel division unit 53 of FIG. 9 and a view for explaining the operation, respectively.

The luminance signal S1(Y) and the color difference signal S1(C) of the input picture signal S1 of progressive scanning are respectively inputted to line memories 56-1 and 56-2. As shown by FIG. 10B, the line memory 56-1 stores signals (scanning lines ①, ③, . . . in figure) of scanning lines corresponding to first interlace scanning in WT operation for 1 line period of fH. Meanwhile, in RD operation, signals are read for a time period of 2fH twice as much as that in WT operation by which signals SM'(Y) and SM'(C) of interlace scanning are provided.

The line memory 56-2 stores signal (scanning lines ②, ④, . . . in figure) of scanning lines corresponding to second interlace scanning in WT operation for 1 line period of fH. Meanwhile, in RD operation, signals are read for a time period of 2fH twice as much as that in WT operation by which signals SI'(Y) and SI'(C) of interlace scanning are provided.

Figure 11A:
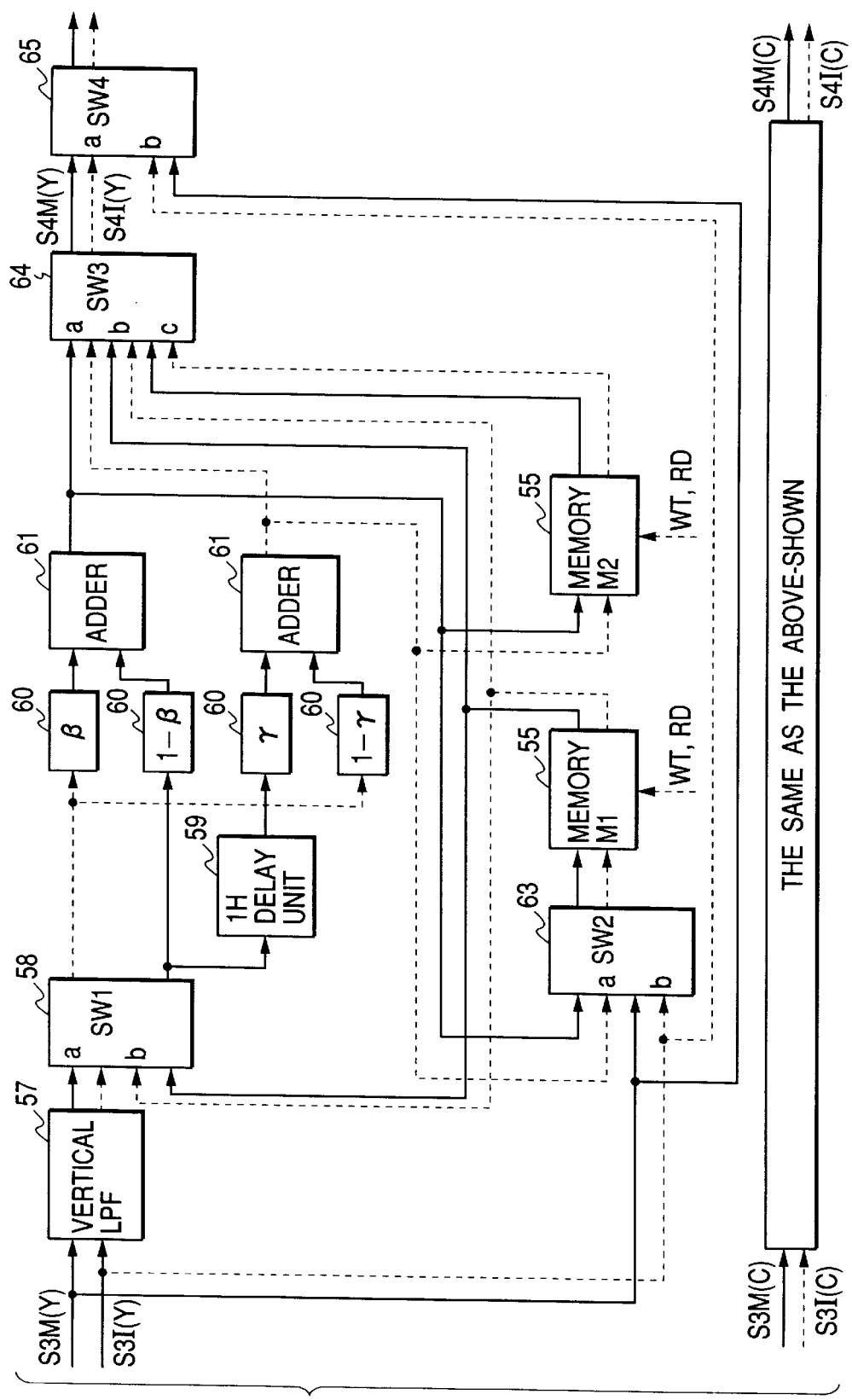
FIG. 11A is a block diagram of a vertical scaling unit 54 of FIG. 9.
Figures 11B, 12A:
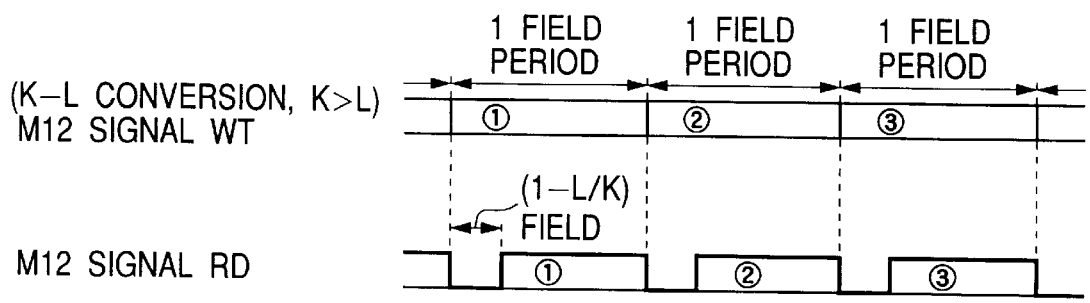
FIG. 11B is an explanatory view of the operation of the vertical scaling unit 54 of FIG. 9.
FIG. 12A is an outline view of the operation of a memory in the case of a vertical compression processing of the vertical scaling unit 54 of FIG. 9.

FIG. 11A and FIG. 11B are a block diagram of the vertical scaling unit 54 of FIG. 9 and a view showing the operation of selective control of switches in the vertical scaling unit 54.

According to signal processing of vertical compression at the vertical scaling unit 54, output lines of switches 58(SW1), 63(SW2) and 65(SW4) are connected to terminals "a" and an output line of the switch 64(SW3) is connected to a terminal "b", respectively. Two series of picture signals of luminance signals S3M(Y) and S3I(Y) are subjected to band restriction by low pass frequency characteristics at a vertical LPF 57 to remove vertical high frequency components constituting an aliasing noise in compression processing. Linear interpolation process of vertical K-L conversion (K>L) is performed by a calculation unit constituted by a 1 line delay element 59, coefficient product units 60 and adders 61. That is, in one signal way, the signals S3M(Y) and S3I(Y) are multiplied by coefficient values $\beta$ and $1-\beta$ at the coefficient product units 60 and both are added at the adder 61. In the other signal way, a signal formed by delaying the signal S3M(Y) by 1 line at the 1 line delay element 59 and the signal S3I(Y) are multiplied by coefficient values $\gamma$ and $1-\gamma$ at the coefficient product units 60 and both are added at the adder 61.

In this method, two series of signals comprising signals of L lines formed from K lines by vertical K-L conversion are provided. Incidentally, the coefficient values $\beta$, $1-\beta$, $\gamma$ and $1-\gamma$ are changed at the respective lines. For example, in 4-3 line number conversion, the coefficient values $(\beta, 1-\beta)$ are changed for each line such as (1,0), (1/3, 2/3), (2/3, 1/3), (1, 0), . . . , and the coefficient values $(\gamma, 1-\gamma)$ are changed for each line such as (2/3, 1/3), (1, 0), (1/3, 2/3), (2/3, 1/3), . . . . . As shown by FIG. 12A, at a memory M1 of a memory 55, WT operation and RD operation are performed with 1 field period as a period. In WT operation, two series of signals formed by K-L conversion are intermittently written and stored. Meanwhile, in RD operation, two series of signals are continuously read from time points delayed by (1−L/K) field period and two series of signals S4M(Y) and S4I(Y) which have been subjected to vertical compression at a multiplication factor of L/K are provided as outputs of the switch 65(SW4). As memory capacity necessary for signal processing of vertical compression described above, a capacity of (1−L/K) field period is sufficient.

Figure 12B:
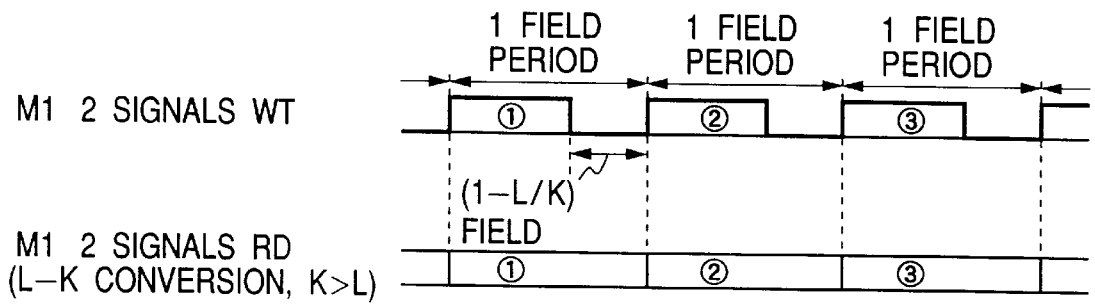
FIG. 12B is an outline view of the operation of a memory in the case of the vertical expansion processing of the vertical scaling unit 54 of FIG. 9.

According to signal processing of vertical expansion, the output lines of the switches 58(SW1) and 63(SW2) are connected to the terminals "b" and the output lines of the switches 64(SW3) and 65(SW4) are connected to the terminals "a". As shown by FIG. 12B, at the memory M1, WT operation and RD operation are performed with 1 field period as a period. The luminance signals S3M(Y) and S3I(Y) of two series of picture signals are continuously stored by WT operation. Meanwhile, in RD operation, repetition RD operation is performed at portions of period and two series of signals of L lines are read in a period of K lines. Linear interpolation process of L-K conversion (L<K) of lines is performed by the calculation unit constituted by the 1 line delay element 59, the coefficient product units 60 and the adders 61. That is, in one signal way, the signals of S3M(Y) and S3I(Y) are multiplied by the coefficient values $\beta$ and $1-\beta$ at the coefficient product units 60 and both are added at the adder 61.

In the other signal way, a signal produced by delaying the signal S3M(Y) by 1 line at the 1 line delay element 59 and the signals of S3I(Y) are multiplied by coefficient values $\gamma$ and $1-\gamma$ at the coefficient product units 60 and both are added at the adder 61. Two series of signals comprising signals of K lines formed from L lines by L-K conversion are provided as outputs. Incidentally, the coefficients values $\beta$, $1-\beta$, $\gamma$ and $1-\gamma$ are changed at the respective lines. For example, according to 3-4 line number conversion, the coefficient values $(\beta, 1-\beta)$ are changed for the respective lines such as (1, 0), (2/4, 2/4), (1, 0), . . . and the coefficient values $(\gamma, 1-\gamma)$ are changed for the respective lines such as (1/4, 3/4), (3/4, 1/4), (1/4, 3/4) . . . . Further, two series of signals S4M(Y) and S4I(Y) which have been vertically expanded by a multiplication factor K/L are provided as outputs of the switch 65(SW4). As memory capacity necessary for signal processing of vertical expansion described above, a signal of (1−L/K) field period is sufficient.

Figure 12C:
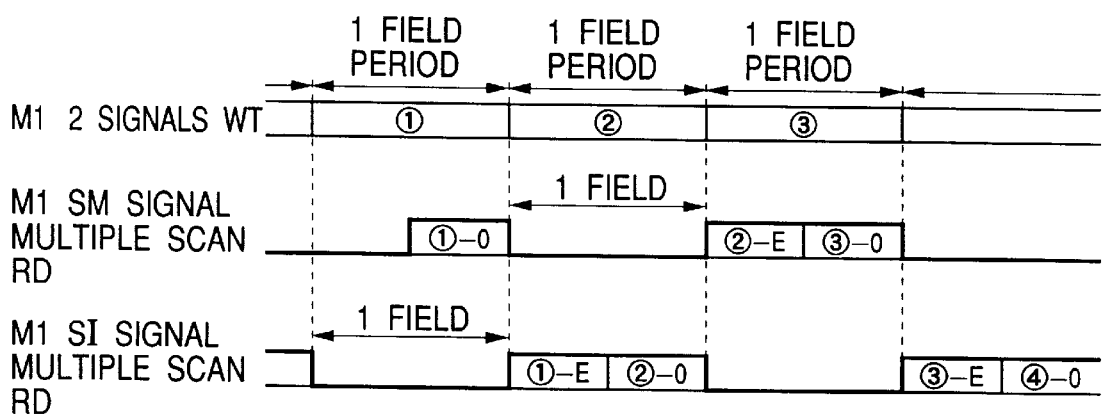
FIG. 12C is an outline view of the operation of a memory in the case of PAL 100 Hz of the vertical scaling unit 54 of FIG. 9.

According to signal processing of PAL 100 Hz, a signal of PAL system (625/50/1:1) converted into progressive scanning is converted into a signal of PAL 100 Hz system (625/100/2:1) of interlace scanning of 100 fields/second, which is realized by respectively connecting the output lines of SW2 and SW3 to the terminals "b" and the output line of SW4 to the terminal "a". At the memory M1, WT operation and RD operation shown by FIG. 12C are performed. The luminance signals S3M(Y) and S3I(Y) of two series of PAL signals are stored continuously in WT operation with 1 field period as a period. Meanwhile, in RD operation, signals are read in the order of a signal (◯-0 in figure) and a signal (◯-E in figure) from time point delayed by 0.5 field period. Further, two series of signals SM4(Y) and S4I(Y) of PAL 100 Hz are provided as outputs from the switch 65(SW4). As memory capacity necessary for signal processing of PAL 100 Hz described above, a capacity of 1 field period is sufficient.

Figure 12D:
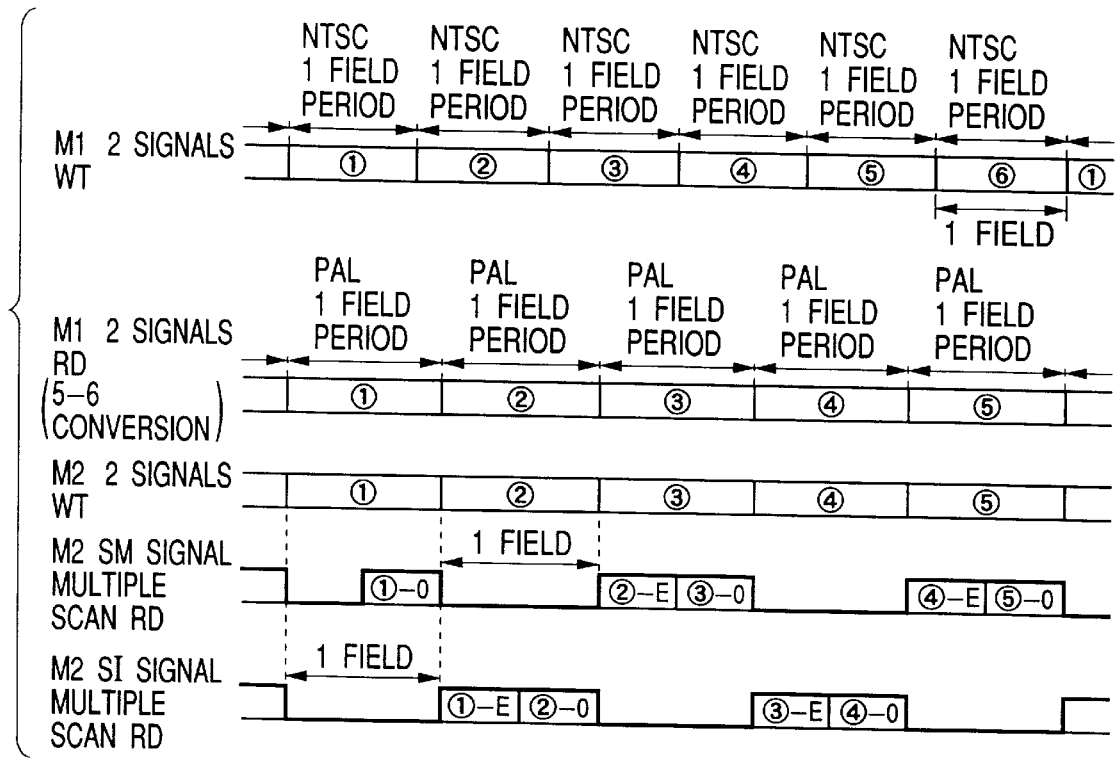
FIG. 12D is an outline view of the operation of a memory in the case of NTSC-PAL 100 Hz of the vertical scaling unit 54 of FIG. 9.

According to signal processing of NTSC/PAL 100 Hz, a signal of NTSC system (525/60/1:1) converted into progressive scanning are converted into a signal of 625/100/2:1 system in which the output lines of the switches 58(SW1) and 63(SW2) are connected to the terminals "b", the output line of the switch 64(SW3) is connected to a terminal "c" and the output line of the switch 65(SW4) is connected to the terminal "a", respectively. As shown by FIG. 12D, the luminance signals S3M(Y) and S3I(Y) of two series of NTSC system are continuously stored to the memory M1 by WT operation with NTSC 1 field period as a period. Meanwhile, in RD operation, repetition RD operation is performed at portions of period and two series of signals of 5 lines are read in a period of 6 lines.

Next, vertical expansion is performed by linear interpolation process of 5-6 line number conversion by the calculation unit constituted by the 1 line delay element 59, the coefficient product units 60 and the adders 61. That is, in one signal way, the signals S3M(Y) and S3I(Y) are multiplied by the coefficient values $\beta$ and $1-\beta$ at the coefficient product units 60 respectively and both are added at the adder 61. In the other signal way, a signal formed by delaying the signal S3M(Y) by 1 line at the 1 line delay element 59 and the signal S3I(Y) are multiplied by the coefficient values $\gamma$ and $1-\gamma$ at the coefficient product units 60 and both are added at the adder 61. Two series of signals comprising signals of 6 lines formed from 5 lines by 5-6 line number conversion are provided as the outputs of addition. Incidentally, the coefficient values $\beta$, $1-\beta$, $\gamma$ and $1-\gamma$ are respectively changed at the respective lines. Signals are stored continuously in WT operation to a memory M2 of the memory 55 with PAL 1 field as a period. Meanwhile, in RD operation, signals are read in the order of a signal (◯-0 in figure) and a signal (◯-E in figure) from time point delayed by 0.5 field period. Further, two series of signals S4M(Y) and S4I(Y) of NTSC-PAL 100 Hz are provided as outputs from the switch 65(SW4). As memory capacity necessary for signal processing of NTSC-PAL 100 Hz described above, a capacity of 1 field period for NTSC-PAL conversion and 1 field period for field multiplex scan conversion is sufficient.

Figure 12E:
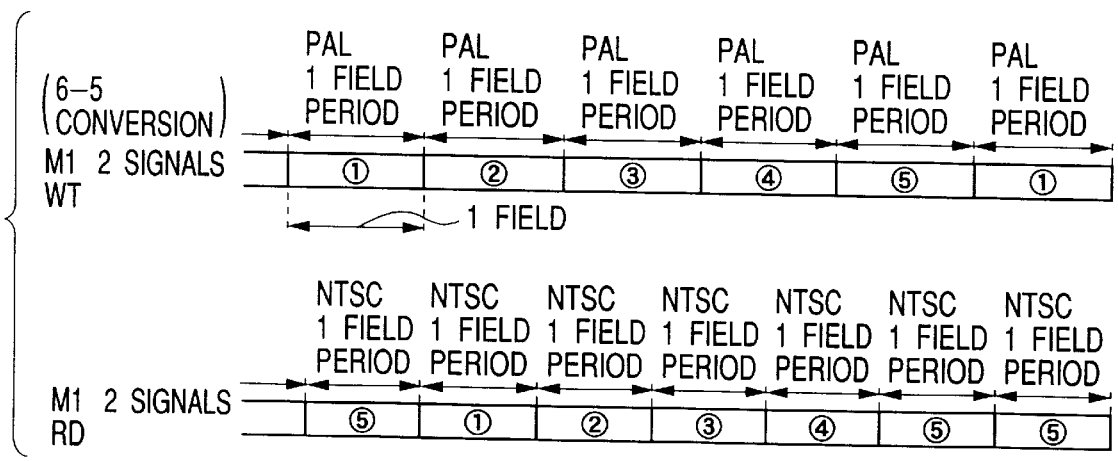
FIG. 12E is an outline view of the operation of a memory in the case of PAL-NTSC conversion processing of the vertical scaling unit 54 of FIG. 9.

According to signal conversion of PAL-NTSC conversion, a signal of 625/50/1:1 system is converted into a signal of 525/60/1:1 system in which the output lines of the switches 58(SW1) and 63(SW2) are connected to the terminals "a", the output line of the switch 64(SW3) is connected to the terminal "b" and the output line of the switch 65(SW4) is connected to the terminal "a", respectively. The luminance signals S3M(Y) and S3I(Y) of two series of PAL system are subjected to band restriction by low pass frequency characteristic at the vertical LPF 57. Vertical compression is performed by linear interpolation process of 6-5 line number conversion of lines at the calculation unit constituted by the 1 line delay element 59, the coefficient product units 60 and the adders 61. In one signal way, the signal of S3M(Y) and S3I(Y) are multiplied by the coefficient values $\beta$ and $1-\beta$ at the coefficient product units 60 and both are added at the adder 61. In the other signal way, a signal formed by delaying the signal S3M(Y) by 1 line at the 1 line delay element 59 and the signal S3I(Y) are multiplied by the coefficient values $\gamma$ and $1-\gamma$ at the coefficient product units 60 and both are added at the adder 61. Two series of signals comprising signals of 5 lines formed from 6 lines by 6-5 line number conversion are provided as the outputs. Incidentally, the coefficient values $\beta$, $1-\beta$, $\gamma$ and $1-\gamma$ are changed at the respective lines. As shown by FIG. 12E, at the memory M1, two series of signals formed by 6-5 line number conversion are intermittently written and stored by WT operation with PAL 1 field period as a period. Meanwhile, in RD operation, two series of signals are read with NTSC 1 field period as a period. Further, signals S4M(Y) and S4I(Y) which have been subjected to PAL-NTSC conversion are provided as outputs from the switch 65. As memory capacity necessary for signal processing of PAL-NTSC conversion described above, a capacity of PAL 1 field period is sufficient.

According to through signal processing, the output line of the switch 65 is connected to the terminal "b". Further, two series of signals S4M(Y) and S4I(Y) which have not been subjected to processing of compression or expansion are provided as outputs from the switch 65.

Also in respect of color signals S3M(C) and S3I(C) of two series of picture signals, signal processing having the constitution the same as that in luminance signals is performed and two series of signals S4M(C) and S4I(C) of vertical compression, vertical expansion, PAL 100 Hz, NTSC-PAL 100 Hz, PAL-NTSC conversion or through processing are provided.

As described above, according to the vertical scaling unit 54, various kinds of signal processing necessary for format conversion can be carried out with an extremely small memory capacity. According to the embodiment, in respect of a display such as a high definition display requiring extremely high speed operation for signal processing, a method and a circuit for signal processing of format conversion of picture signal having inconsiderable deterioration of picture quality accompanied by signal processing and an extremely small memory capacity for use can be realized at low cost.

(Embodiment 3)

Figure 13:
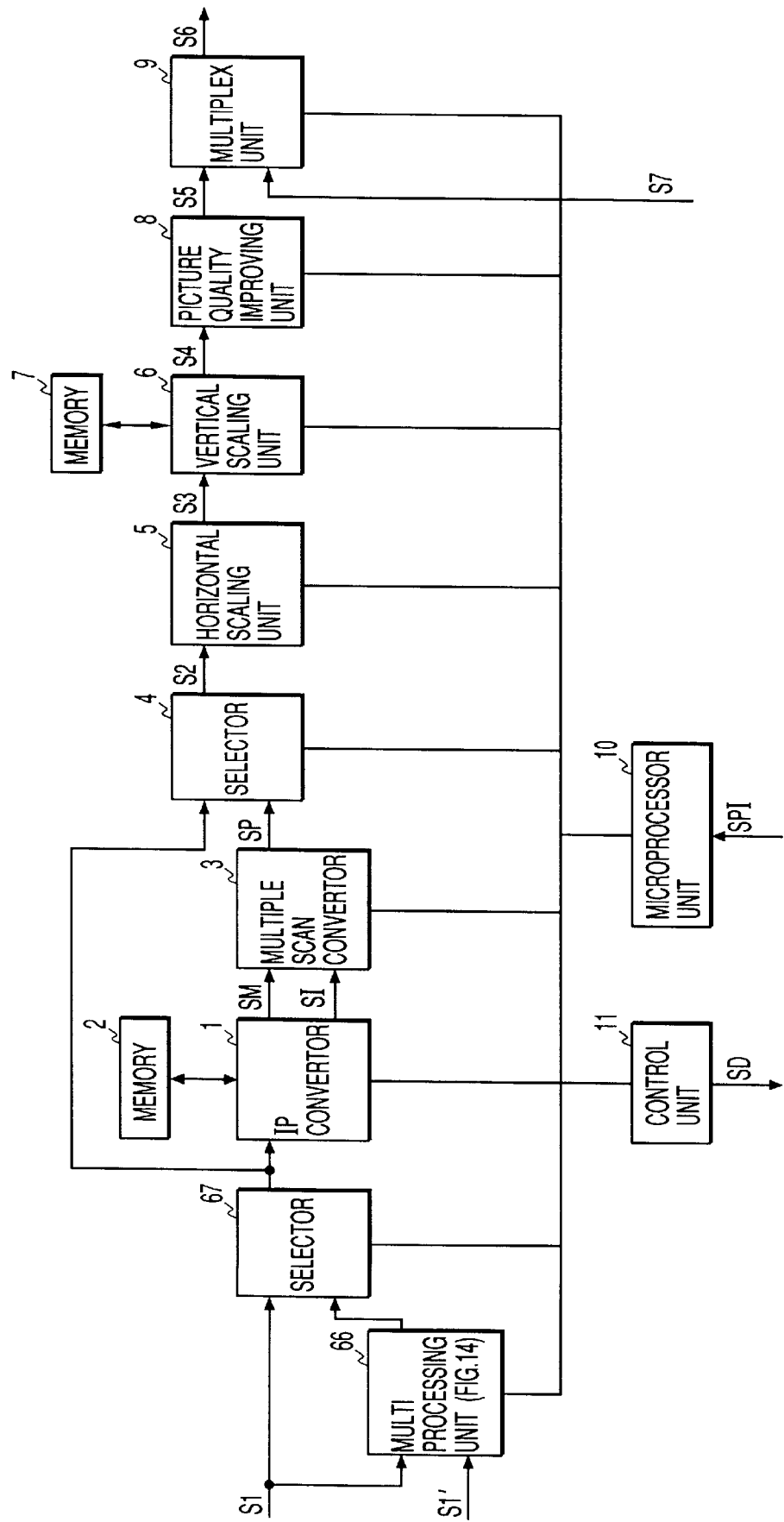
FIG. 13 is a block diagram of a third embodiment of a format conversion circuit of picture signals according to the present invention.

FIG. 13 shows a third embodiment of a format conversion circuit of picture signal according to the present invention. According to the embodiment, a multi processing unit 66 for synthesizing two series of input picture signals and a selector 67 are added to the constitution shown by FIG. 1, which is preferable in the case where both of functions of double windows and PIP display are realized. In FIG. 13, portions having the constitution and function substantially the same as those in FIG. 1 are attached with notations the same as those in FIG. 1 and a detailed explanation thereof will be omitted.

A first input picture signal S1 (comprising component luminance and color difference signals of 4:2:2 system or 4:2:0 system) is inputted to the multi processing unit 66 and the selector 67. Further, a second input picture signal S1' (comprising component luminance and color difference signals of 4:2:2 system or 4:2:0 system) is inputted to the multi processing unit 66.

At the multi processing unit 66, signal processing of multiplexing the first and the second picture signals into a time-division multiplex signal is carried out by which a signal for double windows or PIP display is formed. The selector 67 outputs the first picture signal S1 in one window mode and a signal from the multi processing unit 66 in double windows or PIP display mode.

Figure 14:
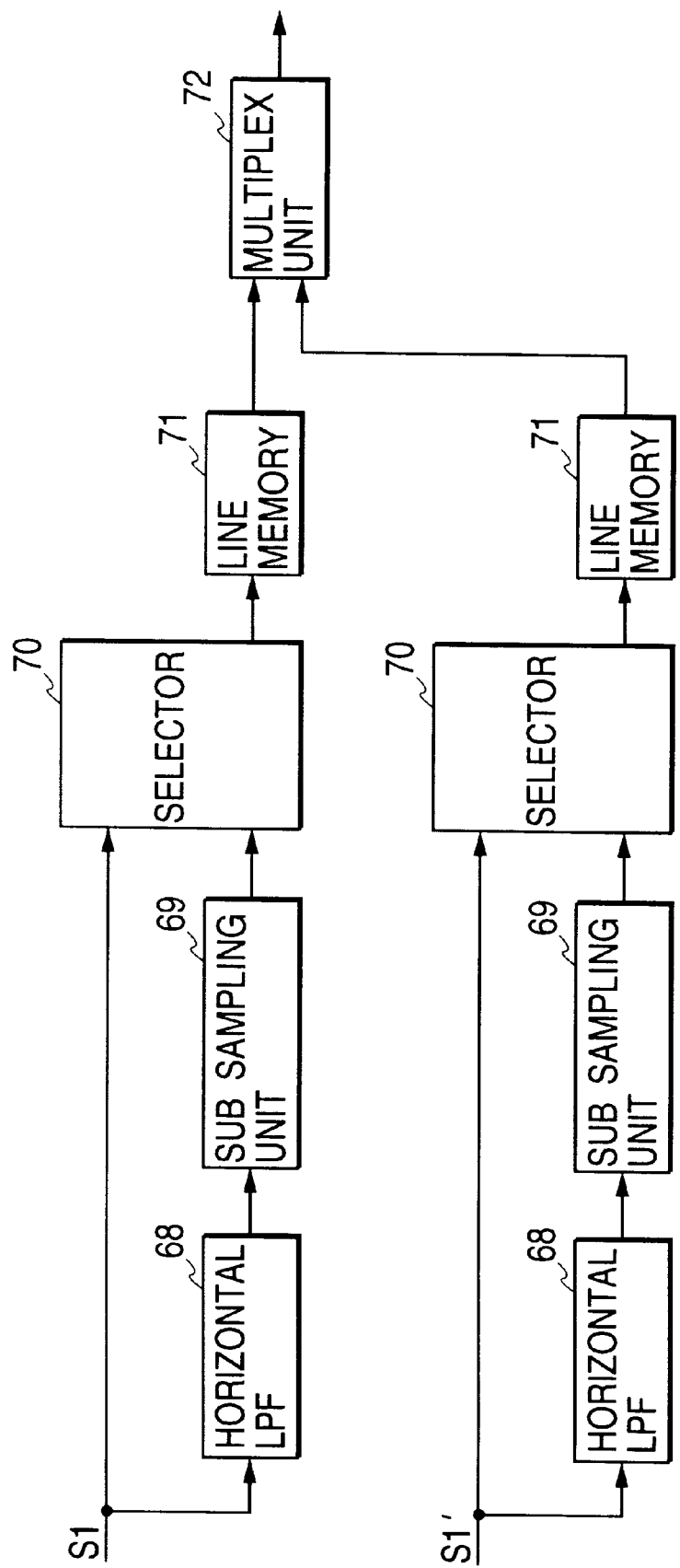
FIG. 14 is a block diagram of a multi processing unit 66 of FIG. 13.

FIG. 14 is a block diagram showing the constitution of the multi processing unit 66, FIG. 15A is a view for explaining an outline of the operation of the multi processing unit in double windows according to the embodiment and FIG. 15B is a view for explaining an outline of the operation of the multi processing unit in PIP display, respectively.

As shown by FIG. 14, at horizontal LPFs 68, horizontal high frequency components are removed by low pass characteristic to avoid an aliasing noise accompanied by sub sampling processing. Further, at sub sampling units 69, signal processing of sub sampling of 2:1 in double windows and 6:1 in PIP display is performed. As mentioned later, selectors 70 select signals of S1 and S1' in double windows of cut mode and signals from the sub sampling units 69 in the other cases.

Line memories 71 perform WT operation and RD operation shown by FIGS. 15A and 15B. Output signals from the line memories 71 are subjected to time division multiplex at a multiplex unit 72 by which a signal for double windows or PIP display is formed. A detailed description will be given of the operation of the line memories 71 in reference to FIGS. 15A and 15B as follows. Both FIGS. 15A and 15B show a case where 1 line is constituted by 910 picture elements and a number of effective picture elements among them is 768.

FIG. 15A shows the operation of the memories 71 in double windows. In cut mode, each of picture signals S1 and S1' is displayed at ⅗ of screen (hatched region in figure). Accordingly, in WT operation, signals of 454 picture elements shown by dots are stored with 1 line period as a period. Incidentally, phases of horizontal synchronization are shifted normally between the signals S1 and S1'. Meanwhile, RD operation is performed by a synchronizing system of the signal S1. A signal (◯-L in figure) of the signal S1 is read in a period of 454 picture elements from the front of 1 line, and a signal (◯-R in figure) of the signal S1' is read in a period of successive 454 picture elements. In RD operation, horizontal synchronization is performed by which horizontally synchronized output signals are provided. Incidentally, although according to the output signals, phases of vertical synchronization are shifted in the signals S1 and S1', the shift is corrected by signal processing of vertical (V) synchronization at a vertical scaling unit 6, mentioned later.

In full mode, full pictures (dot regions in figure) of the picture signals S1 and S1' are displayed respectively. Therefore, in WT operation, signals of 384 picture elements subjected to 2:1 sub sampling are stored with 1 line period as a period. Meanwhile, RD operation is performed by the synchronizing system of the signal S1. A signal (◯-L in figure) of the signal S1 is read at an earlier half of 1 line, and a signal (◯-R in figure) of the signal S1' is read in a later half thereof. Output signals which have been subjected to horizontal (H) synchronization are provided by the RD operation. Incidentally, similar to cut mode, phase shift in vertical synchronization is corrected by signal processing of vertical synchronization at a vertical scaling unit 6, mentioned later.

FIG. 15B shows operation of the memories 71 in PIP display. In this case, a main picture is constituted by picture of the signal S1, and a sub picture is constituted by picture of cinema mode formed by compressing picture of the signal S1' by ⅓. Therefore, according to WT operation, all of 768 effective picture elements of the signal S1 are stored with 1 line as a period. Further, in respect of the signal S1', a signal of 128 picture elements which has been subjected to 6:1 sub sampling is stored. Meanwhile, RD operation is performed by the synchronizing system of the signal S1, in which the 768 picture elements signal of the signal S1 is read from the front of 1 line and the 128 picture elements signal of the signal S1' is read successively. Output signals which have been subjected to horizontal synchronization are provided by the RD operation. Further, phase shift of vertical synchronization is corrected by signal processing of vertical synchronization at a vertical scaling unit 6, mentioned later.

Figure 16B:
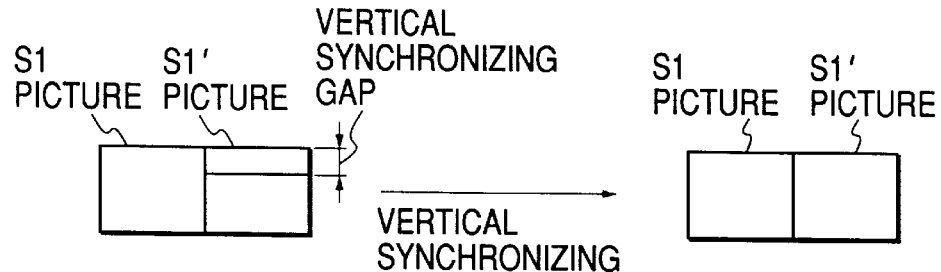
FIG. 16B is an outline view of vertical synchronizing processing of the horizontal and vertical scaling units of FIG. 13.
Figure 16C:
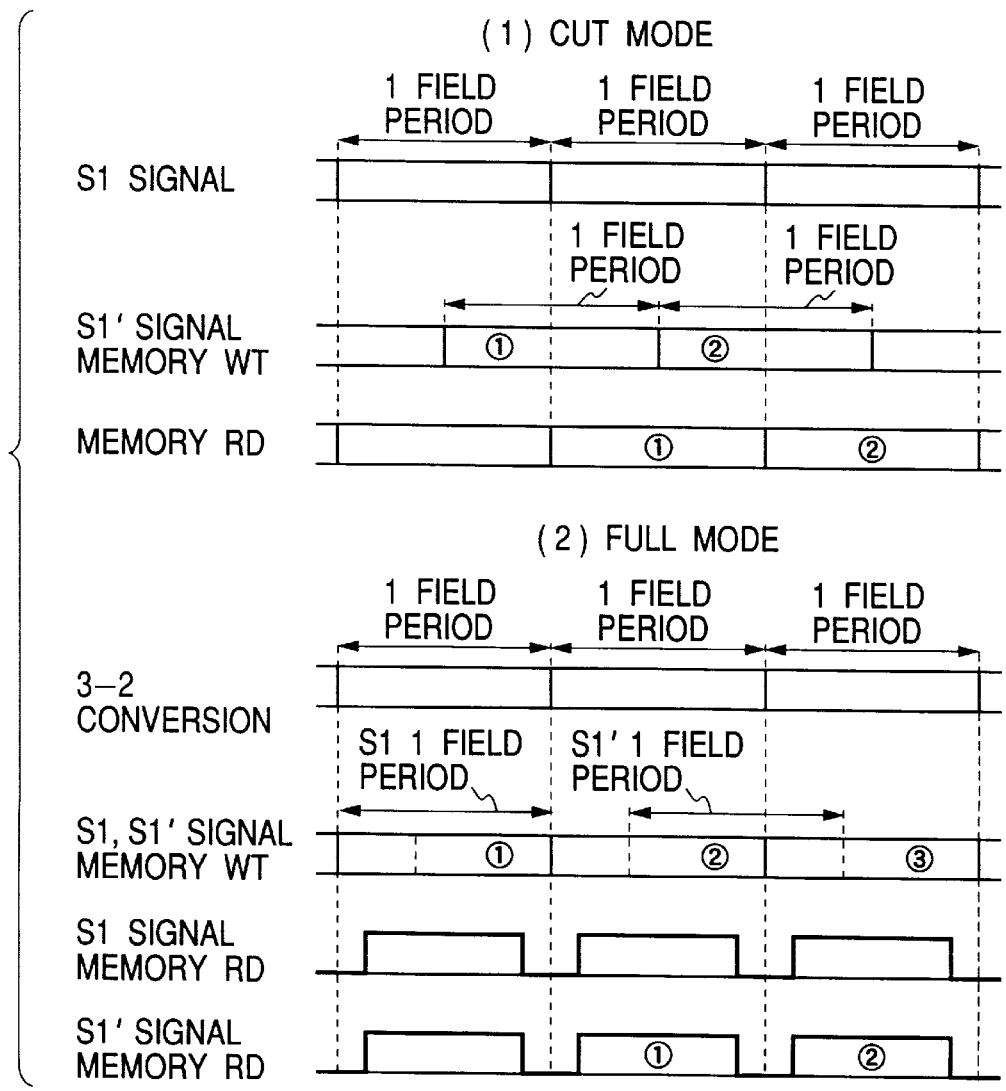
FIG. 16C is an outline view of the operation of a memory in the vertical synchronizing processing at the horizontal and vertical scaling units of FIG. 13.

FIG. 16A shows content of signal processing of horizontal and vertical scaling units 5 and 6 in double windows and PIP display, FIG. 16B shows an outline view of vertical synchronization and FIG. 16C shows an outline of the operation of a memory in vertical synchronization, respectively.

As shown by FIG. 16A, in cut mode of double windows, the horizontal scaling unit 5 performs processing of 4-3 line number compression conversion and the vertical scaling unit 6 performs processing of vertical synchronization. Further, in full mode, the vertical scaling unit 6 performs processing of 3-2 line number compression conversion and vertical synchronization. Meanwhile, in PIP display, the horizontal scaling unit 5 performs 4-3 line number compression conversion in respect of a main picture, processing of 1-2 line number expansion conversion in respect of a sub picture and the vertical scaling unit 6 performs processing of 9-4 line number compression conversion and vertical synchronization in respect of the sub picture. Further, in respect of one window display, processing similar to that in the first embodiment mentioned above is carried out.

As shown by FIG. 16B, although the signals which have been subjected to horizontal synchronization are inputted to the horizontal and vertical scaling units 5 and 6, a phase of vertical synchronization is shifted between the signal S1 and the signal S1' and causes vertical synchronizing gap. Therefore, the phase of vertical synchronization of the signal S1' is made to coincide with that of the signal S1 by processing of vertical synchronization.

As shown by FIG. 16C, in cut mode, through processing is carried out to a signal (earlier half of each line) of the signal S1. Meanwhile, a signal (later half of each line) of the signal S1' is stored to the memory 71 by WT operation. Further, RD operation is performed by the synchronization system of the signal S1 and a signal which has been subjected to vertical synchronization is read. Incidentally, as memory capacity necessary for the signal processing, a capacity of 1 field period is sufficient at maximum.

According to full mode, in WT operation, a signal (earlier half of each line) of the signal S1 formed by 3-2 line number conversion and a signal (later half of each line) of the signal S1' are intermittently written and stored. Meanwhile, in RD operation, both of reading of the signal (earlier half of each line) of the signal S1 and reading of the signal (later half of each line) of the signal S1' are performed by the synchronizing system of the signal S1. Thereby, a signal having vertical synchronization is provided. Incidentally, as memory capacity necessary for the signal processing, a capacity of ⅓ (as mentioned before, K=3, L=2 in (1−L/K)) field period is sufficient for vertical compression and 1 field period in vertical synchronization at maximum.

As mentioned above, according to the embodiment, a method and a circuit for signal processing of format conversion of picture signal having both functions of double windows and PIP display, can be realized with inconsiderable deterioration of picture quality accompanied by signal processing and with an extremely small memory capacity for use at low cost.

(Embodiment 4)

Figure 17:
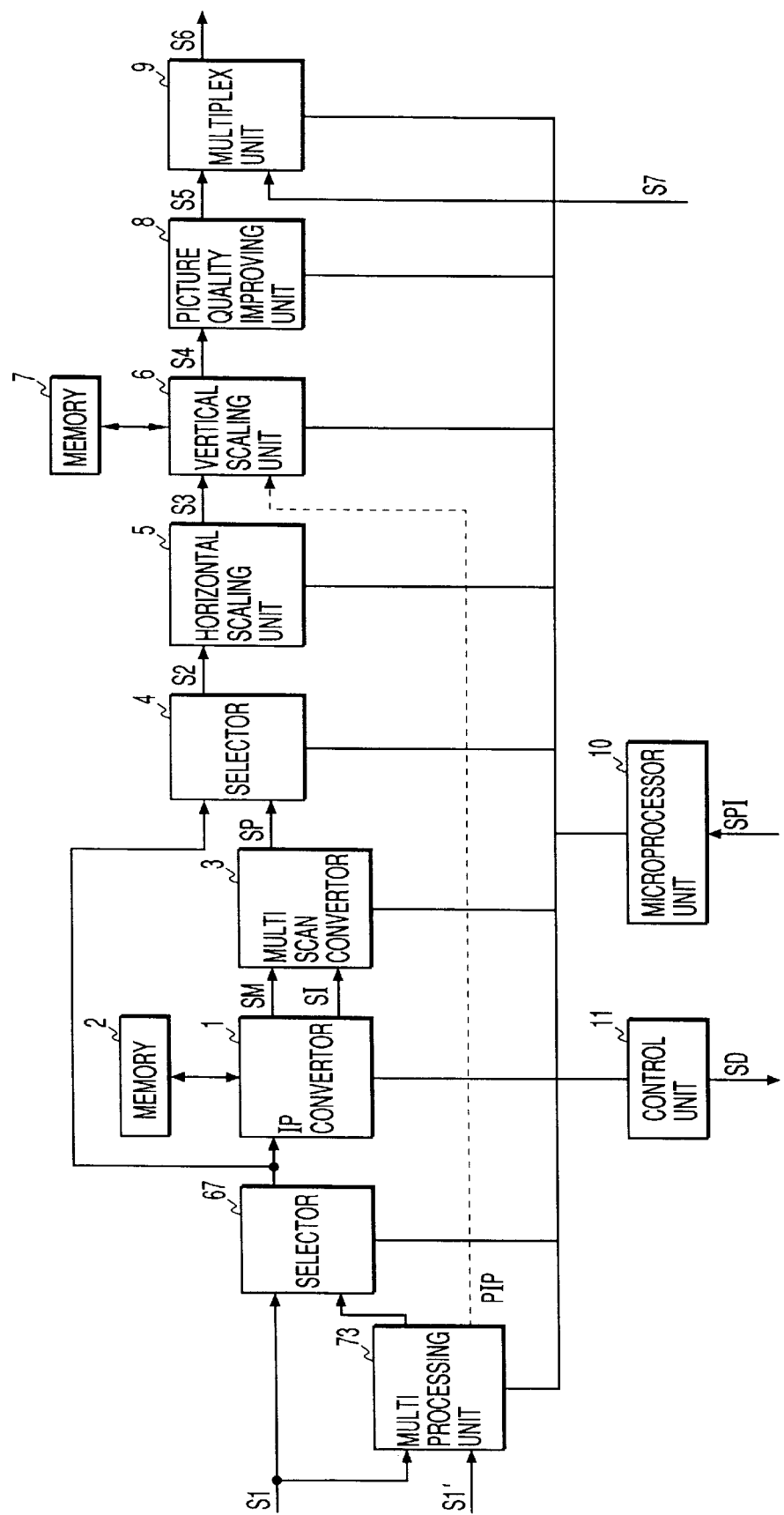
FIG. 17 is a block diagram of a fourth embodiment of a format conversion circuit of picture signals according to the present invention.

FIG. 17 shows a fourth embodiment of a format conversion circuit of picture signal according to the present invention. The embodiment is provided with the constitution similar to that in Embodiment 3. In constituting a sub picture for PIP display by processing the signal S1', although 6:1 sub sampling is performed in the case of Embodiment 3 in respect of the sampling operation, according to Embodiment 4, the sampling is constituted by 3:1 sub sampling by which a number of picture elements is increased. The embodiment is preferable in the case where the functions of performing double windows and PIP display are also realized similar to Embodiment 3. A multi processing unit 73 is a processing unit for carrying out such a sub sampling. Portions in FIG. 17 having the constitution and function the same as those in FIG. 1 are attached with notations the same as those in FIG. 1 and a detailed explanation will be omitted.

The first input picture signal S1 (comprising component luminance and color difference signals of 4:2:2 system or 4:2:0 system) is inputted to the multi processing unit 73 and the selector 67. Further, a second input picture signal S1' (comprising component luminance and color difference signals of 4:2:2 system or 4:2:0 system) is inputted to the multi processing unit 73. The multi processing unit 73 performs signal processing of multiplexing the first and the second picture signals S1 and S1' into a time division multiplex signal which forms a signal for double windows and a signal of the sub picture for PIP display. The selector 67 outputs the first picture signal S1 in one window mode and a signal outputted from the multi processing unit 73 in double windows.

Figure 18:
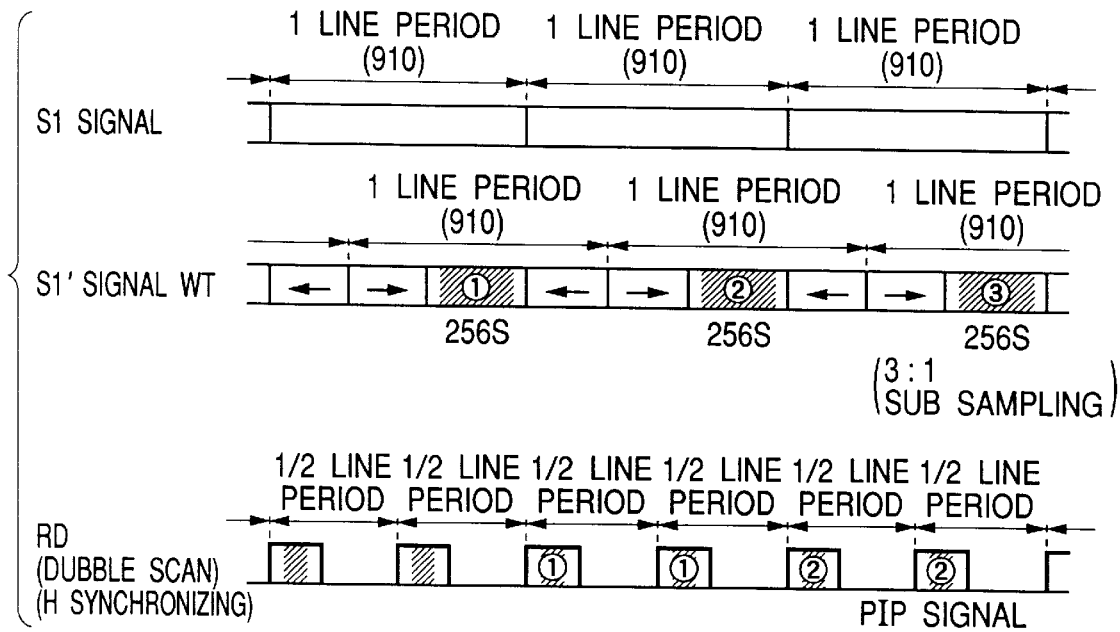
FIG. 18 is an outline view of signal processing of PIP display at a multi processing unit 73 of FIG. 17.

FIG. 18 is a view for explaining formation of the sub picture signal for PIP display at the multi processing unit 73.

According to PIP display, a main picture is constituted by the picture of the signal S1 and the sub picture is constituted by a picture of cinema mode formed by compressing the picture of the signal S1' by $\frac{1}{3}$. Accordingly, a signal of 256 picture elements provided by performing 3:1 sub sampling to the signal S1' is stored to the memory 71 by WT operation with 1 line period as a period in a synchronizing system of the signal S1'. Meanwhile, according to RD operation, a signal is read at a speed twice as much as that of WT operation by the synchronizing system of the signal S1. Thereby, a sub picture signal PIP in a mode of progressive scanning having horizontal synchronization of the signal S1 is formed. The signal PIP is subjected to processing of 9-4 line number compression conversion and vertical synchronization at the vertical scaling unit 6 by which the sub picture of cinema mode is constituted. Incidentally, except signal processing in PIP display, the constitution and signal processing of the embodiment are similar to those in Embodiment 3 and an explanation thereof will be omitted.

As mentioned above, according to Embodiment 4, a method and a circuit for signal processing of format conversion of picture signal having both functions of double windows and PIP display, can be realized with inconsiderable deterioration of picture quality accompanied by signal processing and an extremely small memory capacity for use at low cost.

According to the present invention, a method and a circuit for signal processing of format conversion of picture signal for converting a plurality of formats of picture signals into picture signals of predetermined display formats of picture output devices or performing scaling processing of flexible expansion and compression in the horizontal and the vertical directions of picture, can be realized with inconsiderable deterioration of picture quality accompanied by signal processing and an extremely small memory capacity for use at low cost. Therefore, a significant effect is achieved in promoting function of various information device terminals in correspondence with multimedia and reduction in cost.

It is further understood by those skilled in the art that the foregoing description is a preferred embodiment of the disclosed device and that various changes and modifications may be made in the invention without departing from the spirit and scope thereof.

What is claimed is:

1. A circuit for signal processing of format conversion of picture signal which performs signal processing of converting a format of an input picture signal into a predetermined display format of a picture output device, said circuit comprising:

a scanning convertor for performing first local signal processing of converting the input picture signal into a picture signal of progressive scanning when the input picture signal is of interlace scanning;

a first selector for selecting either one of the input picture signal and the picture signal of progressive scanning outputted from the scanning convertor;

a scaling unit comprising a horizontal scaling unit for performing second local signal processing of compression and expansion in a horizontal direction to a signal selected by the first selector and a vertical scaling unit performing third local signal processing of compression and expansion in a vertical direction to thereof; and a control unit for selecting parameters of the signal processing in accordance with the format of the input picture signal and the display format of the picture output device and controlling at least the scanning convertor, the first selector and the scaling unit in accordance with the parameters of the signal processing.

2. A circuit for signal processing of format conversion of picture signal according to claim 1, wherein the scanning convertor comprises:

a first convertor for converting the input picture signal into a transmission scanning line signal transmitted in interlace scanning and an interpolation scanning line signal formed by interpolating scanning lines skipped in interlace scanning when the input picture signal is of interlace scanning; and a multiple scan convertor for multiplexing the transmission scanning line signal and the interpolation scanning line signal to a signal of progressive scanning by fifth local signal processing of time-division multiplex with compressing a time axis by $\frac{1}{2}$.

3. A circuit for signal processing of format conversion of picture signal according to claim 2, wherein the first convertor comprises:

a motion detector for detecting a motion coefficient of picture of the input picture signal;

a circuit for constituting a first interpolation signal and a second interpolation signal by performing an intrafield calculation and an interfield calculation respectively to the input picture signal; and a circuit for providing the interpolation scanning line signal by varying a mixture ratio of the first interpolation signal and the second interpolation signal by the motion coefficient.

4. A circuit for signal processing of format conversion of picture signal according to claim 1, wherein the horizontal scaling unit comprises a calculation unit for multiplying a plurality of picture elements by coefficient values, a line memory and a plurality of switches wherein signal processing of either one of compression in a horizontal direction, expansion in a horizontal direction and through processing is selectively performed by selective control of the switches.

5. A circuit for signal processing of format conversion of picture signal according to claim 1, wherein the horizontal scaling unit comprises:

a low pass filter for removing an aliasing noise from an input signal to the horizontal scaling unit;

a 1 horizontal scanning line memory;

a first switch for selecting either one of a signal outputted from the 1 horizontal scanning line memory and a signal outputted from the low pass filter;

a calculation unit for delaying a signal outputted from the first switch by one picture element period, forming a first signal by multiplying the delayed signal by a coefficient $\beta$ ($1>\beta\geq0$), forming a second signal by multiplying the signal outputted from the first switch by a coefficient $1-\beta$ and adding the first signal and the second signal;

a second switch for selecting either one of the input signal to the horizontal scaling unit and a signal outputted from the calculation unit and inputting the selected signal to the 1 horizontal scanning line memory;

a third switch for selecting either one of the signal outputted from the 1 horizontal scanning line memory and the signal outputted from the calculation unit;

a fourth switch for selecting either one of a signal outputted from the third switch and the input signal to the horizontal scaling unit; and wherein signal processing of either one of compression in a horizontal direction, expansion in a horizontal direction and through processing is selectively performed by selective control of the switches.

6. A circuit for signal processing of format conversion of picture signal according to claim 1, wherein the vertical scaling unit comprises a calculation unit for multiplying picture elements in a plurality of lines by coefficient values, field memories and a plurality of switches, wherein signal processing of either one of compression in a vertical direction, expansion in a vertical direction and through processing is selectively performed by selective control of the switches.

7. A circuit for signal processing of format conversion of picture signal according to claim 1, wherein the vertical scaling unit comprises:

a low pass filter for removing an aliasing noise from an input signal to the vertical scaling unit;

a first field memory;

a first switch for selecting either one of an output signal read from the first field memory and a signal outputted from the low pass filter;

a calculation unit for forming a first signal by delaying a signal outputted from the first switch by one line period and multiplying the delayed output signal by a coefficient $\beta$ ($1>\beta\geq0$), forming a second signal by multiplying the signal outputted from the first switch by a coefficient $1-\beta$ and adding the first signal and the second signal;

a second switch for selecting either one of the input signal to the vertical scaling unit and a signal outputted from the calculation unit and inputting the selected signal to the first field memory;

a second field memory for delaying the signal outputted from the calculation unit;

a third switch for selecting either one of the signal outputted from the calculation unit, an output signal read from the first field memory and an output signal read from the second field memory;

a fourth switch for selecting either one of a signal outputted from the third switch and the input signal to the vertical scaling unit; and wherein signal processing of either one of compression in a vertical direction, expansion in a vertical direction, through processing, field multiple scanning and PAL-NTSC system conversion is selectively performed by selective control of the switches.

8. A circuit for signal processing of format conversion of picture signal according to claim 1, wherein the horizontal scaling unit and the vertical scaling unit comprise circuits for performing the second local signal processing of compression in a horizontal direction and expansion in a horizontal direction, and the third local signal processing of compression in a vertical direction and expansion in a vertical direction respectively by linear interpolation process.

9. A circuit for signal processing of format conversion of picture signal according to claim 1, wherein the horizontal scaling unit is a circuit for performing only signal processing of compression in a horizontal direction and through processing and the vertical scaling unit is a circuit for performing the third local signal processing to a signal outputted from the horizontal scaling unit.

10. A circuit for signal processing of format conversion of picture signal according to claim 1, wherein the horizontal scaling unit is a circuit for performing only signal processing of expansion in a horizontal direction and through processing to a signal outputted from the vertical scaling unit.

11. A circuit for signal processing of format conversion of picture signal according to claim 1, wherein a picture quality improving unit controlled by the control unit for performing signal processing of at least one of color space conversion and inverse gamma conversion to a signal outputted from the scaling unit is connected to an output terminal of the scaling unit.

12. A circuit for signal processing of format conversion of picture signal according to claim 11, wherein a multiplex unit controlled by the control unit for multiplexing another display picture signal to a signal outputted from the picture quality improving unit is connected to an output terminal of the picture quality improving unit.

13. A circuit for signal processing of format conversion of picture signal according to claim 1, further comprising:

a color signal multiplex unit for multiplexing two color difference signals of the input picture signal into a time-division multiplex signal; and wherein the time-division multiplex signal outputted from the color multiplex unit is inputted to the scanning convertor and the first selector.

14. A television receiver comprising:

the circuit for signal processing of format conversion of picture signal according to claim 1; and a picture output device for displaying picture of a signal outputted from the circuit for signal processing of format conversion.

15. A method for signal processing of format conversion of a picture signal, which is for converting a format of an input picture signal into a predetermined display format of a picture output device, the method comprising the steps of:

providing a picture signal of progressive scanning directly from the input picture signal when the input picture signal is of progressive scanning, and providing a picture signal of progressive scanning by converting the input picture signal into a picture signal of progressive scanning when the input picture signal is of interlace scanning; and performing a scaling operation of at least one of compression in a horizontal direction, expansion in a horizontal direction, compression in a vertical direction, expansion in a vertical direction, and frame rate conversion on the provided picture signal of progressive scanning in accordance with the format of the input picture signal and the predetermined display format of the picture output device;

wherein the step of performing a scaling operation includes the step of controlling a scaling unit with signal processing parameters determined in accordance with the format of the input picture signal and the predetermined display format of the picture output device, the scaling unit including a controllable horizontal scaling unit for selectively performing the compression in the horizontal direction and the expansion in the horizontal direction depending on the signal processing parameters, and a controllable vertical scaling unit for selectively performing the compression in the vertical direction, the expansion in the vertical direction, and the frame rate conversion depending on the signal processing parameters.

16. A method for signal processing of format conversion of a picture signal according to claim 15, wherein the compression in the horizontal direction, the expansion in the horizontal direction, the compression in the vertical direction, and the expansion in the vertical direction are performed by a linear interpolation process including the steps of:

multiplying signals of a pair of picture elements contiguously arranged respectively in the horizontal direction and in the vertical direction by coefficients; and adding together products obtained in the multiplying step.

17. A method for signal processing of format conversion of a picture signal, which is for converting a format of an input picture signal into a predetermined display format of a picture output device, the method comprising the steps of:

providing a picture signal of progressive scanning directly from the input picture signal when the input picture signal is of progressive scanning, and providing a picture signal of progressive scanning by converting the input picture signal into a picture signal of progressive scanning when the input picture signal is of interlace scanning; and performing a scaling operation of at least one of compression in a horizontal direction, expansion in a horizontal direction, compression in a vertical direction, expansion in a vertical direction, and frame rate conversion on the provided picture signal of progressive scanning in accordance with the format of the input picture signal and the predetermined display format of the picture output device;

wherein in performing the scaling operation, when the scaling operation of the compression in the horizontal direction is performed, the scaling operation of either one of the compression in the vertical direction and the expansion in the vertical direction is performed after performing the scaling operation in the horizontal direction, and when the scaling operation of the expansion in the horizontal direction is performed, the scaling operation of the expansion in the horizontal direction is performed after performing the scaling operation of either one of the compression in the vertical direction and the expansion in the vertical direction.

18. A method for signal processing of format conversion of a picture signal, which is for converting a format of an input picture signal into a predetermined display format of a picture output device, the method comprising the steps of:

providing a picture signal of progressive scanning directly from the input picture signal when the input picture signal is of progressive scanning, and providing a picture signal of progressive scanning by converting the input picture signal into a picture signal of progressive scanning when the input picture signal is of interlace scanning; and performing a scaling operation of at least one of compression in a horizontal direction, expansion in a horizontal direction, compression in a vertical direction, expansion in a vertical direction, and frame rate conversion on the provided picture signal of progressive scanning in accordance with the format of the input picture signal and the predetermined display format of the picture output device;

wherein signal processing of at least one of color space conversion and inverse gamma conversion is performed on a picture signal which has been subjected to the scaling operation.

19. A method for signal processing of format conversion of a picture signal, which is for converting a format of an input picture signal into a predetermined display format of a picture output device, the method comprising the steps of:

providing a picture signal of progressive scanning directly from the input picture signal when the input picture signal is of progressive scanning, and providing a picture signal of progressive scanning by converting the input picture signal into a picture signal of progressive scanning when the input picture signal is of interlace scanning; and performing a scaling operation of at least one of compression in a horizontal direction, expansion in a horizontal direction, compression in a vertical direction, expansion in a vertical direction, and frame rate conversion on the provided picture signal of progressive scanning in accordance with the format of the input picture signal and the predetermined display format of the picture output device;

wherein the input picture signal is a component signal of either one of 4:2:2 and 4:2:0 including a luminance signal and color difference signals.

20. A circuit for signal processing of format conversion of picture signal which performs signal processing of converting a format of an input picture signal into a predetermined display format of a picture output device, said circuit comprising:

a scanning convertor for performing first local signal processing of converting the input picture signal into a picture signal of progressive scanning when the input picture signal is of interlace scanning;

a first selector for selecting either one of the input picture signal and the picture signal of progressive scanning outputted from the scanning convertor;

a scaling unit comprising a horizontal scaling unit for performing second local signal processing of compression and expansion in a horizontal direction to a signal selected by the first selector and a vertical scaling unit performing third local signal processing of compression and expansion in a vertical direction to thereof; and a control unit for selecting parameters of the signal processing in accordance with the format of the input picture signal and the display format of the picture output device and controlling at least the scanning convertor, the first selector and the scaling unit in accordance with the parameters of the signal processing, further comprising:

a multi processing unit for inputting a first picture signal and a second picture signal both having a same format and performing fourth local signal processing of multiplexing the first picture signal and the second picture signal into a time-division multiplex signal during one scanning line period;

a second selector for constituting the input picture signal by selecting either one of the first picture signal and the time-division multiplex signal outputted from the multi processing unit; and wherein the control unit is constituted to have the scanning convertor, the first selector and the scaling unit perform the signal processing to the first picture signal in case of one window display and perform the signal processing to the time-division multiplex signal outputted from the multi processing unit in case of double windows.

21. A circuit for signal processing of format conversion of picture signal according to claim 20, wherein the multi processing unit comprising:

a first filter for removing an aliasing noise of the first picture signal;

a first sampling unit for sub-sampling a signal outputted from the filter;

a fourth selector for selecting either one of a signal outputted from the first sampling unit and the first picture signal;

a first line memory connected to an output terminal of the fourth selector;

a second filter for removing an aliasing noise of the second picture signal;

a second sampling unit for sub-sampling a signal outputted from the second filter;

a fifth selector for selecting either one of a signal outputted from the second sampling unit and the second picture signal;

a second line memory connected to an output terminal of the fifth selector; and a multiplex unit for multiplexing a signal outputted from the first line memory and a signal outputted from the second line memory into a time-division multiplex signal.

22. A circuit for signal processing of format conversion of picture signal according to claim 20, wherein the scanning convertor comprises:

a first convertor for converting the input picture signal into a transmission scanning line signal transmitted in interlace scanning and an interpolation scanning line signal formed by interpolating scanning lines skipped in interlace scanning when the input picture signal is of interlace scanning; and a multiple scan convertor for multiplexing the transmission scanning line signal and the interpolation scanning line signal to a signal of progressive scanning by fifth local signal processing of time-division multiplex with compressing a time axis by ½.

23. A circuit for signal processing of format conversion of picture signal according to claim 20, wherein the horizontal scaling unit comprises a calculation unit for multiplying a plurality of picture elements by coefficient values, a line memory and a plurality of switches wherein signal processing of either one of compression in a horizontal direction, expansion in a horizontal direction and through processing is selectively performed by selective control of the switches.

24. A circuit for signal processing of format conversion of picture signal according to claim 20, wherein the vertical scaling unit comprises a calculation unit for multiplying picture elements in a plurality of lines by coefficient values, field memories and a plurality of switches, wherein signal processing of either one of compression in a vertical direction, expansion in a vertical direction and through processing is selectively performed by selective control of the switches.

25. A circuit for signal processing of format conversion of picture signal according to claim 20, wherein the horizontal scaling unit is a circuit for performing only signal processing of compression in a horizontal direction and through processing and the vertical scaling unit is a circuit for performing the third local signal processing to a signal outputted from the horizontal scaling unit.

26. A circuit for signal processing of format conversion of picture signal according to claim 20, wherein the horizontal scaling unit is a circuit for performing only signal processing of expansion in a horizontal direction and through processing to a signal outputted from the vertical scaling unit.

27. A television receiver comprising:

the circuit for signal processing of format conversion of picture signal according to claim 20; and a picture output device for displaying picture of a signal outputted from the circuit for signal processing of format conversion.

28. A method for signal processing of format conversion of picture signal, which is for converting a format of an input picture signal into a predetermined display format of a picture output device, said method comprising the steps of:

performing signal processing of multiplexing a first picture signal and a second picture signal both having a same format to a time-division multiplex signal during one scanning line period;

constituting the input picture signal by selecting either one of the first picture signal and the time-division multiplex signal;

providing a picture signal of progressive scanning directly from the input picture signal when the input picture signal is of progressive scanning and providing a picture signal of progressive scanning by converting the input picture signal into a picture signal of progressive scanning when the input picture signal is of interlace scanning; and performing a scaling operation of at least one of compression in a horizontal direction, expansion in a horizontal direction, compression in a vertical direction, expansion in a vertical direction and frame rate conversion to the provided picture signal of progressive scanning in accordance with the format of the input picture signal and the predetermined display format of the picture output device.

29. A method for signal processing of format conversion of picture signal according to claim 28, wherein in performing the scaling operation, when the scaling operation of the compression in the horizontal direction is performed, the scaling operation of either one of the compression in the vertical direction and the expansion in the vertical direction is performed after performing the scaling operation in the horizontal direction and when the scaling operation of the expansion in the horizontal direction is performed, the scaling operation of the expansion in the horizontal direction is performed after performing the scaling operation of either one of the compression in the vertical direction and the expansion in the vertical direction.

30. A circuit for signal processing of format conversion of picture signal which performs signal processing of converting a format of an input picture signal into a predetermined display format of a picture output device, said circuit comprising:

a first convertor for converting the input picture signal into a transmission scanning line signal transmitted in interlace scanning and an interpolation scanning line signal formed by interpolating scanning lines skipped in interlace scanning when the input picture signal is of interlace scanning;

a second convertor for converting the input picture signal into a transmission scanning line signal transmitted in interlace scanning and an interpolation scanning line signal formed by interpolating scanning lines skipped in interlace scanning when the input picture signal is of progressive scanning;

a third selector for selecting either one of a set of the transmission scanning line signal and the interpolation scanning line signal outputted from the first convertor and a set of the transmission scanning line signal and the interpolation scanning line signal outputted from the second convertor;

a scaling unit comprising a horizontal scaling unit for performing second local signal processing of compression in a horizontal direction and expansion in a horizontal direction to each of signals selected by the third selector and a vertical scaling unit for performing third local signal processing of compression in a vertical direction and expansion in a vertical direction to thereof;

a multiple scan convertor for converting signals outputting from the scaling unit into a signal of progressive scanning by fifth local signal processing of time-division multiplex with compressing a time axis by ½; and a control unit for selecting parameters of the signal processing in accordance with the format of the input picture signal and the predetermined display format of the picture output device and controlling at least the first convertor, the second convertor, the third selector, the scaling unit and the multiple scan convertor in accordance with the parameters of the signal processing.

31. A circuit for signal processing of format conversion of picture signal according to claim 30, wherein the horizontal scaling unit comprises a calculation unit for multiplying a plurality of picture elements by coefficient values, a line memory and a plurality of switches, wherein signal processing of either one of compression in a horizontal direction, expansion in a horizontal direction and through processing is selectively performed by selective control of the switches.

32. A circuit for signal processing of format conversion of picture signal according to claim 30, wherein the vertical scaling unit comprises a calculation unit for multiplying picture elements in a plurality of lines by coefficient values, field memories and a plurality of switches, wherein signal processing of either one of compression in a vertical direction, expansion in a vertical direction and through processing is selectively performed by selective control of the switches.

33. A circuit for signal processing of format conversion of picture signal according to claim 30, wherein the horizontal scaling unit is a circuit for performing only signal processing of compression in a horizontal direction and through processing and the vertical scaling unit is a circuit for performing the third local signal processing to a signal outputted from the horizontal scaling unit.

34. A circuit for signal processing of format conversion of picture signal according to claim 30, wherein the horizontal scaling unit is a circuit for performing only signal processing of expansion in a horizontal direction and through processing to a signal outputted from the vertical scaling unit.

35. A television receiver comprising:

the circuit for signal processing of format conversion of picture signal according to claim 30; and a picture output device for displaying picture of a signal outputted from the circuit for signal processing of format conversion.

* * * * *